US 9,274,619 B2

(12) United States Patent
Okuyama

(10) Patent No.: US 9,274,619 B2
(45) Date of Patent: Mar. 1, 2016

(54) INPUT APPARATUS, INPUT METHOD, AND INPUT PROGRAM

(71) Applicant: HONDA MOTOR CO., LTD., Tokyo (JP)

(72) Inventor: Haruko Okuyama, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/224,471

(22) Filed: Mar. 25, 2014

(65) Prior Publication Data

US 2014/0292692 A1  Oct. 2, 2014

(30) Foreign Application Priority Data

Mar. 27, 2013  (JP) ................. 2013-067249

(51) Int. Cl.
*G06F 3/0354* (2013.01)
*G06F 3/0482* (2013.01)
*B60K 37/06* (2006.01)
*B62D 1/04* (2006.01)
*G06F 3/038* (2013.01)
*G06F 3/041* (2006.01)
*G06F 3/048* (2013.01)

(52) U.S. Cl.
CPC ............ *G06F 3/03547* (2013.01); *B60K 37/06* (2013.01); *B62D 1/046* (2013.01); *G06F 3/038* (2013.01); *G06F 3/048* (2013.01); *G06F 3/0416* (2013.01); *B60K 2350/1036* (2013.01); *B60K 2350/928* (2013.01)

(58) Field of Classification Search
CPC ........ B60K 37/06; G06F 3/04886; G06F 7/00
See application file for complete search history.

(56) References Cited

U.S. PATENT DOCUMENTS

| 6,703,999 B1 | 3/2004 | Iwanami et al. | |
|---|---|---|---|
| 2006/0047386 A1* | 3/2006 | Kanevsky et al. | 701/36 |
| 2007/0057915 A1* | 3/2007 | Yamauchi | 345/156 |

(Continued)

FOREIGN PATENT DOCUMENTS

| CN | 1804776 | 7/2006 |
|---|---|---|
| JP | 2007-161064 | 6/2007 |

(Continued)

OTHER PUBLICATIONS

Japanese Office Action with English Translation dated Jan. 27, 2015, 8 pages.

(Continued)

*Primary Examiner* — Dwayne Bost
*Assistant Examiner* — Sepehr Azari
(74) *Attorney, Agent, or Firm* — Rankin, Hill & Clark LLP

(57) ABSTRACT

An operation detecting unit detects an operation input direction to an operation input unit attached to a steering wheel, and when an operation input direction recognizing unit recognizes that a vehicle is running, the operation input direction detected by the operation detecting unit is recognized to be a direction corresponding to an arrangement of element images constituting a part of an image to be displayed on an image display unit. Moreover, an operation input direction control unit uses the direction recognized by the operation input direction recognizing unit as the operation input direction related to at least any one of the element images.

8 Claims, 13 Drawing Sheets

(56) References Cited

U.S. PATENT DOCUMENTS

| | | | |
|---|---|---|---|
| 2007/0094617 A1* | 4/2007 | Nurmi | 715/856 |
| 2013/0024071 A1* | 1/2013 | Sivertsen | 701/41 |

FOREIGN PATENT DOCUMENTS

| | | |
|---|---|---|
| JP | 2007-269226 | 10/2007 |
| JP | 2010-105417 | 5/2010 |
| JP | 2010-143324 | 7/2010 |
| JP | 2011-201497 | 10/2011 |
| WO | 01/60650 | 8/2001 |
| WO | 2012/169229 | 12/2012 |

OTHER PUBLICATIONS

European Search Report dated Jun. 8, 2015, 6 pages.
Chinese Office Action with English translation, dated Oct. 9, 2015, 19 pages.

* cited by examiner

FIG. 6
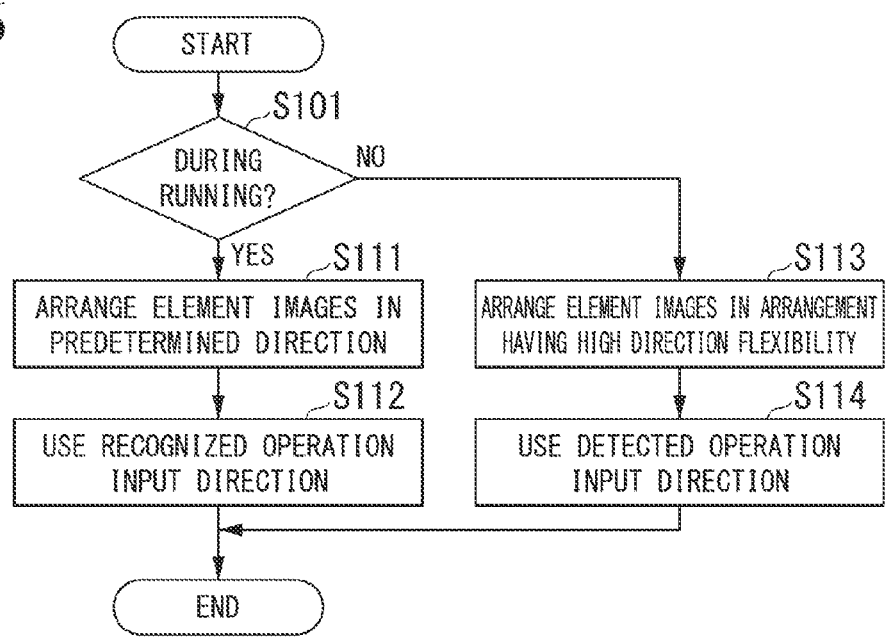
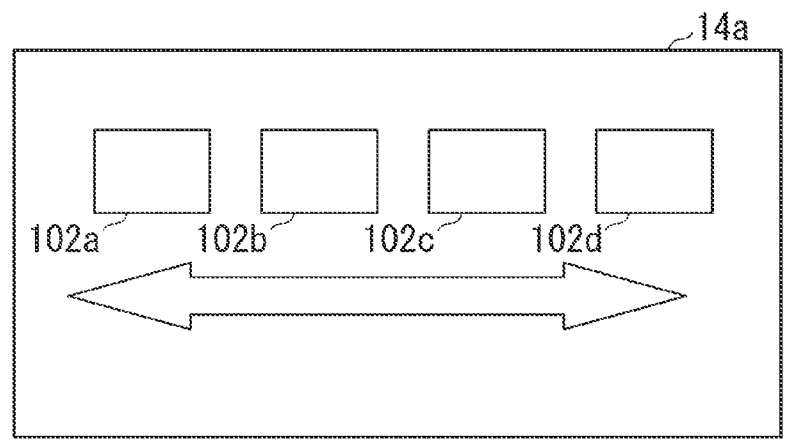
FIG. 7A
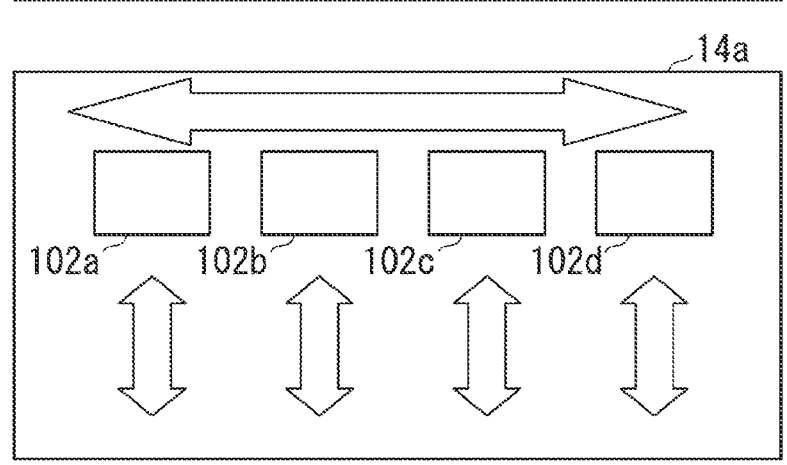
FIG. 7B

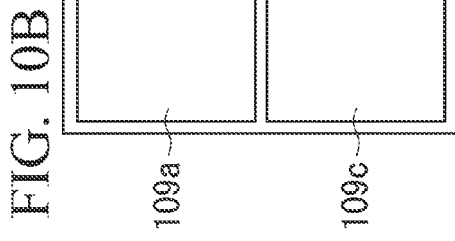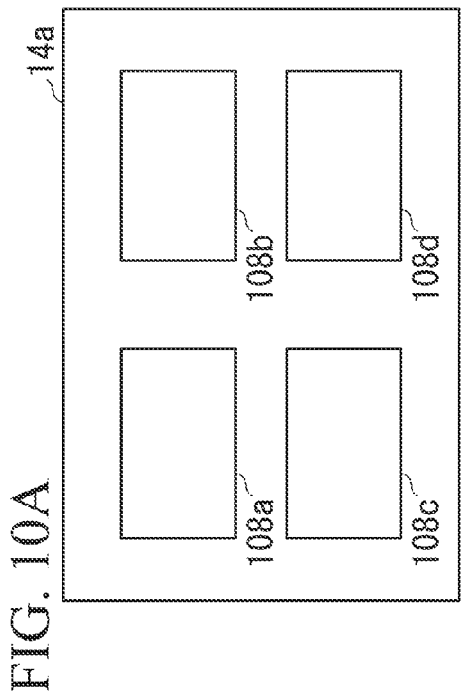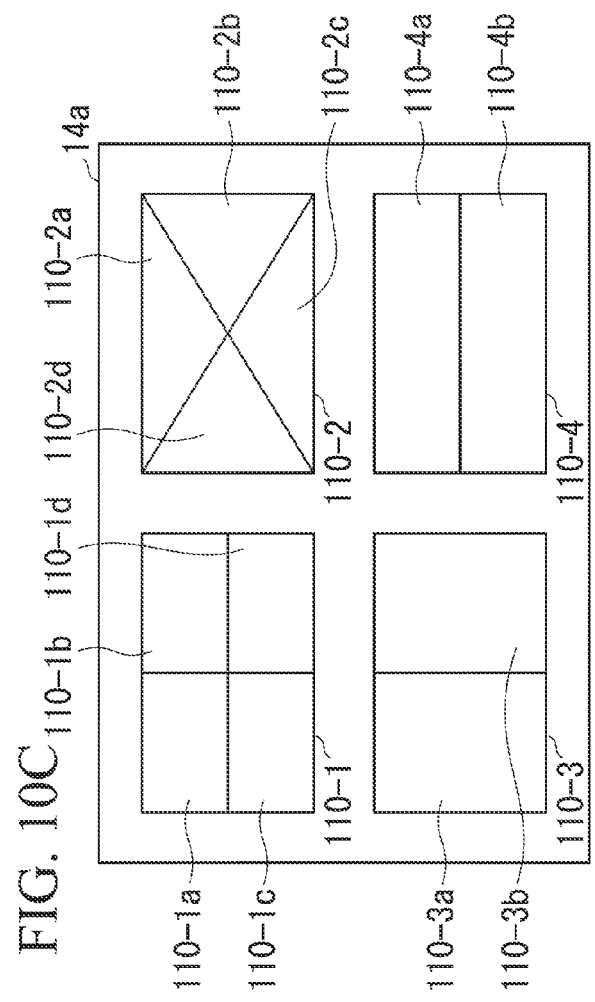

INPUT APPARATUS, INPUT METHOD, AND INPUT PROGRAM

CROSS-REFERENCE TO RELATED APPLICATION

Priority is claimed on Japanese Patent Application No. 2013-067249 filed Mar. 27, 2013, the content of which is incorporated herein by reference.

BACKGROUND

1. Field of the Invention

The present invention relates to an input apparatus, an input method, and an input program.

2. Description of the Related Art

Conventionally, an input device provided with a touch sensor, for example, on a steering wheel of a vehicle to receive an operation performed by a driver during driving of the vehicle has been known. In such an input device, the operation to be received during driving may be simplified more than an operation to be received during stopping in order to ensure operability.

For example, an operation receiving apparatus described in Japanese Unexamined Patent Application, First Publication No. 2011-201497 acquires touch position information indicating a touch position with respect to a steering operating unit, displays an image indicating first selection candidates, which are candidates for operation indications related to a predetermined operation when a vehicle is being stopped, and displays an image indicating either-or of second selection candidates different from the first selection candidates, which are candidates for operation indications related to an operation when a vehicle is running. When the vehicle is being stopped, the operation receiving apparatus receives a first operation indication alternatively selected from the first selection candidates based on a touch position, and when the vehicle is running, the operation receiving apparatus receives a second operation indication alternatively selected from the either-or of the second selection candidates based on the touch position.

SUMMARY

The operation receiving apparatus described in Japanese Unexamined Patent Application, First Publication No. 2011-201497 selects either the displayed predetermined first selection candidates or second selection candidates, and hence, it is not applicable to an arbitrary image, for example, a pre-generated image. Moreover, the selection candidate to be received is changed regardless of the property of the image. Therefore, the operability may not be always improved for an operator.

Aspects of the present invention are aimed at providing an input apparatus, an input method, and an input program, in which operability at the time of performing an input operation during driving is improved.

(1) An input apparatus of one aspect according to the present invention includes: an operation detecting unit that detects an operation input direction to an operation input unit attached to a steering wheel; an operation input direction recognizing unit that recognizes that the operation input direction detected by the operation detecting unit is a direction corresponding to an arrangement of element images constituting a part of an image to be displayed on an image display unit, when a vehicle is running; and an operation input direction control unit that uses the direction recognized by the operation input direction recognizing unit as the operation input direction related to at least either one of the element images.

(2) In an aspect of (1) above, the operation input direction recognizing unit may recognize that the operation input direction detected by the operation detecting unit is a direction having regularity of arrangement of the element images.

(3) In an aspect of either one of (1) and (2) above, the operation input direction recognizing unit may recognize that the operation input direction is a direction corresponding to the arrangement of the element images, when a ratio of a margin in which the element images are not displayed is higher than a predetermined ratio.

(4) In an aspect of any one of (1) through (3) above, the operation input direction recognizing unit may determine whether to restrict the operation input direction according to flexibility in the operation input direction in which the element images can be operated.

(5) In an aspect of any one of (1) through (4) above, the operation input direction recognizing unit may recognize that the operation input direction detected by the operation detecting unit is a direction in which groups of element images to be displayed on the image display unit are arranged, and when any of the groups of the element images is selected, the operation input direction recognizing unit may recognize that the operation input direction detected by the operation detecting unit is a direction in which element images are arranged in any of the groups.

(6) In an aspect of (1) above, there may be further provided a display control unit that controls the direction to arrange the element images to a predetermined direction when the vehicle is running.

(7) In an aspect of any one of (1) through (6) above, there may be further provided a steering angle detecting unit that detects a steering angle of the steering wheel, and the operation input direction control unit may determine whether to correct the operation input direction based on the steering angle detected by the steering angle detecting unit, and when the operation input direction is to be corrected, the operation input direction control unit may use the operation input direction detected by the operation detecting unit as the operation input direction related to at least any one of the element images.

(8) An input method of one aspect according to the present invention includes: an operation detecting step of detecting an operation input direction to an operation input unit attached to a steering wheel; an operation input direction recognizing step of recognizing that the operation input direction detected in the operation detecting step is a direction corresponding to an arrangement of element images constituting a part of an image to be displayed on an image display unit, when a vehicle is running; and an operation input direction control step of using the direction recognized in the operation input direction recognizing step as the operation input direction related to at least any one of the element images.

(9) An input program of one aspect according to the present invention causes a computer of an input apparatus to execute: an operation detecting procedure of detecting an operation input direction to an operation input unit attached to a steering wheel; an operation input direction recognizing procedure of recognizing that the operation input direction detected in the operation detecting procedure is a direction corresponding to an arrangement of element images constituting a part of an image to be displayed on an image display unit, when a vehicle is running; and an operation input direction control procedure of using the direction recognized in the operation input direction recognizing procedure as the operation input direction related to at least any one of the element images.

According to the aspects of (1), (8), and (9) above, because a direction corresponding to the arrangement of element images is used as the operation input direction related to the element images, an operation input that transits between areas related to the element images is not disturbed. As a result, the operability at the time of performing an operation input is improved during driving.

In the case of the aspect (2) above, because the restricted operation direction is a direction having regularity of element images, a user can smoothly perform the operation input that transits between areas related to the element images arranged in this direction.

In the case of the aspect (3) above, even when there are lots of candidates of the element images to be selected because the ratio of the margin is high, the candidates thereof are narrowed down, by restricting the operation input direction to the direction corresponding to the arrangement of element images. Accordingly, the user can easily select the element image.

In the case of the aspect (4) above, because the operation input direction is restricted to the direction corresponding to the arrangement of element images according to the flexibility in the operation input direction, the candidates of the element images to be selected can be narrowed down. Accordingly, the user can select the element images easily.

In the case of the aspect (5) above, by performing selection of the group of element images, selection of the element image in the selected group, and a stepwise operation input by the user, then even if the operation direction is restricted, selection of the element image can be performed smoothly.

In the case of the aspect (6) above, by generating an image in which the element images are arranged in a predetermined direction, then even if the operation input direction is restricted to a direction corresponding to the arrangement of element images also for an image to be generated uniquely, deterioration of operability at the time of performing the operation input can be suppressed during driving.

In the case of the aspect (7) above, by not restricting the operation direction corrected according to the detected steering angle, accuracy of the corrected operation direction can be kept at a high level.

BRIEF DESCRIPTION OF DRAWINGS

FIG. 6 is a flowchart showing another example of the input process according to the present embodiment.

FIG. 7A is a diagram showing a control example (1) of the operation input direction.

FIG. 7B is a diagram showing the control example (1) of the operation input direction.

FIG. 10A is a diagram showing a control example (4) of the operation input direction.

FIG. 10B is a diagram showing the control example (4) of the operation input direction.

FIG. 10C is a diagram showing the control example (4) of the operation input direction.

DESCRIPTION OF THE EMBODIMENTS

Hereunder, an embodiment of the present invention will be described with reference to the drawings.

Figure 1:
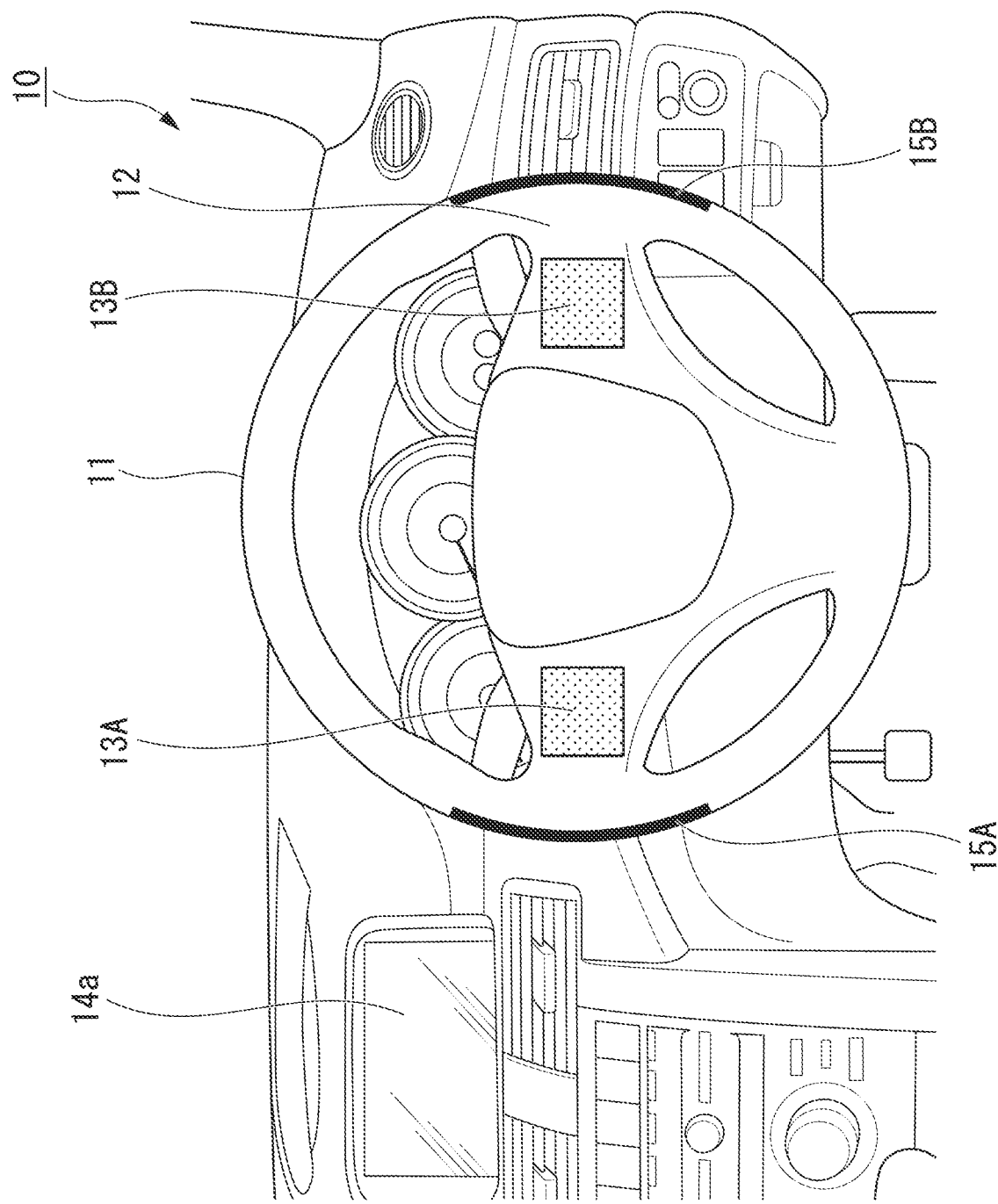
FIG. 1 is a surface view showing an outline of an input apparatus according to an embodiment of the present invention.

FIG. 1 is a surface view showing an outline of an input apparatus 10 according to the present embodiment.

Figure 2:
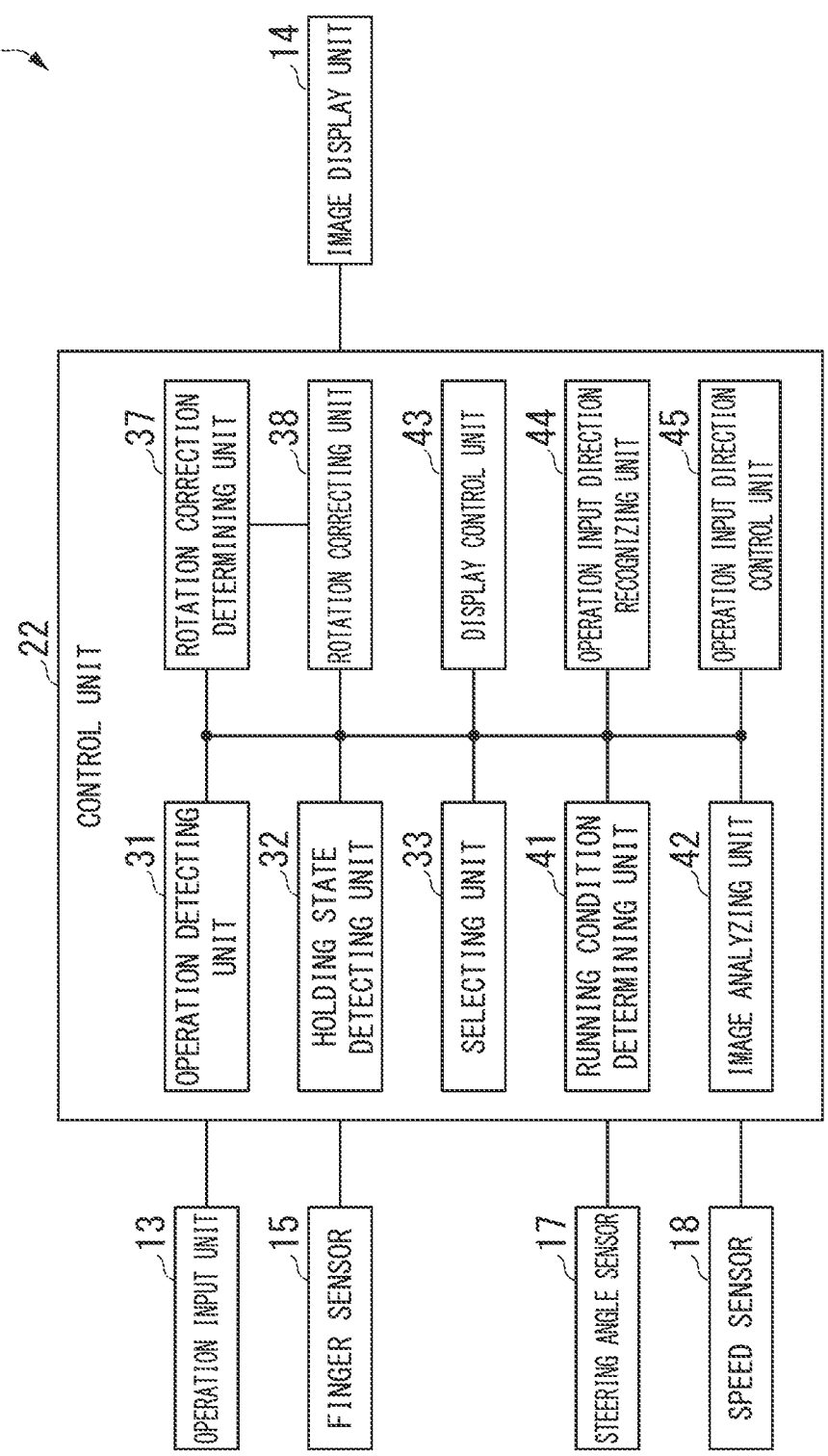
FIG. 2 is a schematic block diagram showing a configuration of the input apparatus according to the present embodiment.

The input apparatus 10 according to the present embodiment is configured to include a holding unit 12 provided on a steering wheel 11 of a vehicle and held by an operator, an operation input unit 13, an image display unit 14 (FIG. 2), and a finger sensor 15 (FIG. 2). The input apparatus 10 is, for example, a route guide device (for example, a navigation device) that guides a driving route to a destination, an acoustic device (for example, an audio device) that reproduces sound contents such as music, a radio receiving device that reproduces sounds transmitted via received broadcast waves, or a multifunction machine having at least one of these functions.

The operation input unit 13 includes operation surfaces 13A and 13B provided on a surface of the holding unit 12 to receive an operation input by being touched by an operation object of the operator, for example, the fingers. The operation input unit 13 is, for example, a touch pad including a touch sensor. The touch sensor is, for example, a capacitance sensor. The operation input unit 13 outputs a contact signal indicating a detected contact area, to a control unit 22 (described later). The operation surfaces 13A and 13B are, for example, touch sensors. In the explanation below, when the operation surfaces 13A and 13B are not differentiated, the operation surfaces 13A and 13B may be referred to as operation surface 13A, or operation surface 13A and the like.

The operation input unit 13 is not limited to the touch sensor or the touch pad including the touch sensor. The operation input unit 13 may be any unit that can detect; a position where the operation object is touched by an operation input, a moving direction of the position, or a force direction, or a unit that can rotate in at least one direction due to the operation input. The operation input unit 13 is not limited to the capacitance sensor, and may be, for example, a pressure sensor, a magnetic sensor, a switch constituted by an arbitrary combination of these, a track pad, a rotary switch, and the like.

The image display unit 14 includes a display screen 14a whose position is fixed in a vehicle, regardless of rotation of the steering wheel 11. The image display unit 14 displays an image on the display screen 14a based on an image signal input from the control unit 22 (FIG. 2) so as to be visible by an operator, for example, a driver. The image to be displayed on the display screen 14a may include for example, a screen component.

The screen component may be an image in which an operation input to the display area displayed on the display screen 14a is received by the operation input unit 13, that is to say, an image to be operated. The operation input received by the screen component may be used for the operation of the input apparatus 10. The screen component is also referred to as an UI (User Interface) component, or a GUI (Graphic User Interface) component, and includes, for example, an icon, a button, a link, or the like.

The image display unit 14 is, for example; a dashboard display in which the display screen 14a is arranged in an upper part of a dashboard of the vehicle, a head-up display that displays an image by using a surface of a front window of the vehicle as the display screen 14a, a multi-information display in which the display screen 14a is arranged in an instrument panel of the vehicle, and a display in which the display screen 14a is arranged near various meters of the instrument panel of the vehicle.

Arrangement of the display screen 14a is fixed regardless of rotation of the steering wheel 11.

The finger sensor 15 includes detection surfaces 15A and 15B provided on the sides of the holding unit 12, to detect a holding area touched by the operation object of the operator. The finger sensor 15 outputs a holding area signal indicating the detected holding area to the control unit 22. The detection surfaces 15A and 15B are, for example, the capacitance sensor, an optical sensor, a temperature sensor, or a pressure sensor. In the description below, when the detection surfaces 15A and 15B are not discriminated, the detection surfaces 15A and 15B may be referred to as detection surface 15A, or detection surface 15A and the like.

(Configuration of the Input Apparatus)

FIG. 2 is a schematic block diagram showing the configuration of the input apparatus 10 according to the present embodiment.

The input apparatus 10 includes; the operation input unit 13, the image display unit 14, the finger sensor 15, a steering angle sensor (steering angle detecting unit) 17, a speed sensor 18, and the control unit 22.

The speed sensor 18 detects the running speed of the vehicle, and outputs a speed signal indicating the detected speed to the control unit 22.

The control unit 22 controls operations of the respective units constituting the input apparatus 10. The control unit 22 is constituted by a processing device such as a CPU (Central Processing Unit), an FPGA (Field Programmable Gate Array), or the like. The control unit 22 implements various functions by reading a program from a recording medium (for example, a ROM (Read Only Memory)) provided therein, and executing the read program. For example, the control unit 22 acquires an image signal, and outputs the acquired image signal to the image display unit 14 to cause the image display unit 14 to display an image. An image (in each frame) to be displayed on the image display unit 14 by the control unit 22 may include a screen component as one or a plurality of element images.

A screen component is an image to be operated. That is to say, when the touch position indicated by the contact signal input from the operation input unit 13 is included in the display area of the screen component (press, selection), the control unit 22 performs a predetermined process with regard to the screen component. The screen component is also referred to as a UI part, a UI component, or the like. The screen component includes, for example, an icon, a link, a button, or the like.

The screen component may be one in which the display position to be displayed on the image display unit 14 is predetermined by an OS (Operating System) or a program such as an application program. Moreover, the control unit 22 may set the display position while executing a program. Furthermore, the control unit 22 may set the display position of the screen component based on the touch position indicated by the contact signal input from the operation input unit 13.

The control unit 22 is configured to include, for example, an operation detecting unit 31, a holding state detecting unit 32, a selecting unit 33, a rotation correction determining unit 37, a rotation correcting unit 38, a running condition determining unit 41, an image analyzing unit 42, a display control unit 43, an operation input direction recognizing unit 44, and an operation input direction control unit 45.

The operation detecting unit 31 determines the contact area indicated by the contact signal input from the operation input unit 13 within a predetermined time interval (for example, 10 ms), and calculates a central point of each of the determined contact areas as a contact position where the operation object touches the operation surface 13A. This is because the contact area in which the operation object touches the operation surface 13A has a size, and a plurality of contact areas may be present. In the determination of the contact area, the operation detecting unit 31 determines that spatially continuous contact areas belong to one contact area. The operation detecting unit 31 generates a touch operation signal indicating the contact area and the contact position.

The operation detecting unit 31 detects; the presence of the contact area, a pressing force, a moving direction of the contact area (operation input direction), a moving amount, and the like, based on the input contact signal, and the detected information may be included in the touch operation signal. Here, the operation detecting unit 31 sets a direction from the touch position immediately before to the current touch position as an operation input direction, and sets a distance between these touch positions as a moving amount.

Moreover, the operation detecting unit 31 may determine the type of a gesture operation based on the determined or calculated information, and include the information indicating the determined type in a touch operation signal. The type of the gesture operation to the operation surface 13A includes for example an operation such as; a tap (click), a rub (slide), a pinch, a trace, a twist, and a shake (flick). The operation detecting unit 31 may determine the type of the gesture operation based on a track of the touch position at which the operation object touches the operation surface 13A.

The operation detecting unit 31 outputs the generated touch operation signal to the selecting unit 33, the display control unit 43, the operation input direction recognizing unit 44, and the operation input direction control unit 45.

The holding state detecting unit 32 detects the state of the fingers (holding state) that hold the steering wheel 11 based on the holding area signal input from the finger sensor 15. For example, in a state in which the holding area indicated by the input holding area signal is on the left side of the steering wheel 11, when a clockwise rotation area (upper part) rather than a counterclockwise rotation area (lower part) from a reference line is larger than a reference value of a predetermined area, the holding state detecting unit 32 determines that the left hand palm (specially, a base (wrist side)) is away from the steering wheel. The reference line is a horizontal line passing through the center when the steering wheel 11 is not steered. This is because when the steering wheel 11 is steered on the right side, the palm is likely to be away from the steering wheel 11 while the fingers touch the steering wheel 11. Moreover, when it is determined that a rightward steering angle A of the steering angle indicated by the steering angle signal input from the steering angle sensor 17 is larger than a predetermined steering angle, the holding state detecting unit 32 may determine that the left hand palm is away from the steering wheel 11.

Furthermore, in a state in which the holding area indicated by the input holding area signal is on the right side of the steering wheel 11, when the counterclockwise rotation area (lower part) rather than the clockwise rotation area (upper part) from the reference line is larger than a reference value of the predetermined area, the holding state detecting unit 32 determines that the right hand palm (specially, the base (wrist side)) is away from the steering wheel. Moreover, when it is determined that a leftward steering angle A of the steering angle indicated by the steering angle signal input from the steering angle sensor 17 is larger than the predetermined steering angle, the holding state detecting unit 32 may determine that the right hand palm is away from the steering wheel 11. In other cases, the holding state detecting unit 32 may determine that the palm is not away from the steering wheel.

The holding state detecting unit 32 outputs a holding state signal indicating the determined holding state to the rotation correcting unit 38.

The selecting unit 33 may select whether to use the direction recognized by the operation input direction recognizing unit 44 (described later) based on the touch operation signal input from the operation detecting unit 31, the operation input signal (for example, ON/OFF signal) input from another switch (not shown), or the like. For example, whether to use the direction recognized by the operation input direction recognizing unit 44 may be changed over every time the touch operation signal input from the operation detecting unit 31 indicates a predetermined type of operation (toggle order).

The predetermined type of operation is, for example, operations described below: (1) an operation (for example, hit repeatedly or double-click) in which touch and untouch are on and off in a predetermined area, (2) an operation in which a touching state at the same position continues longer than a predetermined time (for example, 3 seconds) (for example, press and hold), and (3) touch to a predetermined area (for example, a display area of a correction switching button).

The selecting unit 33 outputs a selection signal indicating whether to use the direction recognized by the operation input direction recognizing unit 44, to the operation input direction control unit 45.

When a rotation correction determination signal input from the rotation correction determining unit 37 indicates correction of the operation coordinate system, the operation input direction control unit 45 does not use the direction recognized by the operation input direction recognizing unit 44, that is to say, the selecting unit 33 may select to use the operation input direction detected by the operation detecting unit 31.

The rotation correction determining unit 37 determines whether to correct the coordinate system (operation coordinate system), which is used as a reference at the time of detecting the touch operation on the operation surface 13A and the like (FIG. 1) accompanying the rotation of the steering wheel 11. For example, when the steering angle indicated by the steering angle signal input from the steering angle sensor 17 is larger than the predetermined threshold of the steering angle, the rotation correction determining unit 37 determines to correct the operation coordinate system with regard to the operation surface 13A and the like. When the steering angle indicated by the steering angle signal is equal to or smaller than the predetermined threshold of the steering angle, the rotation correction determining unit 37 determines not to correct the operation coordinate system with regard to the operation surface 13A and the like. The rotation correction determining unit 37 outputs the rotation correction determination signal indicating whether to correct the operation coordinate system, to the rotation correcting unit 38, the display control unit 43, and the operation input direction control unit 45.

Moreover, the rotation correction determining unit 37 may select whether to correct the operation coordinate system based on the touch operation signal input from the operation detecting unit 31 or a rotation correction switching signal (for example, ON/OFF signal) input from another switch (not shown). For example, whether to correct the operation coordinate system may be changed over every time the touch operation signal input from the operation detecting unit 31 indicates the predetermined type of operation (toggle order). The predetermined type of operation is, for example, the operations described below: (1) an operation (for example, hit repeatedly or the like) in which touch and untouch are on and off in the predetermined area, (2) an operation in which a touching state at the same position continues longer than a predetermined time (for example, 3 seconds) (for example, press and hold), and (3) touch to a predetermined area (for example, a display area of the correction switching button).

When the rotation correction determination signal input from the rotation correction determining unit 37 indicates correction of the operation coordinate system, the rotation correcting unit 38 corrects the touch position indicated by the touch operation signal input from the operation detecting unit 31. As a result, the display position on the display screen 14a corresponding to the touch position or the moving direction indicating the movement thereof, is controlled for the predetermined type of screen components (for example, an icon, an element image to be scrolled, an element image to be dragged, or the like).

A correspondence relation between the coordinate system (operation coordinate system) with regard to the operation surface 13A used at the time of detecting the operation input direction by the operation detecting unit 31 and a coordinate system (display coordinate system) to be used at the time of setting a position for displaying the element image on the display screen 14a of the image display unit 14, is stored beforehand in the rotation correcting unit 38. For example, the operation coordinate system and the display coordinate system are two-dimensional orthogonal coordinate systems having two coordinate axes orthogonal to each other. The operation input direction is the moving direction of the touch position detected by the operation detecting unit 31. The correspondence relation between the operation coordinate system and the display coordinate system is indicated by, for example, a rotation angle between the coordinate axes between these coordinate systems (for example, X axis and Y axis) or an enlargement factor between the coordinate values (for example, X coordinate value and Y coordinate value).

The rotation correcting unit 38 uses the stored correspondence relation to set the position and the moving direction (display coordinate system) corresponding to the touch position and the moving direction (operation coordinate system) indicated by the input touch operation signal.

Figure 3A:
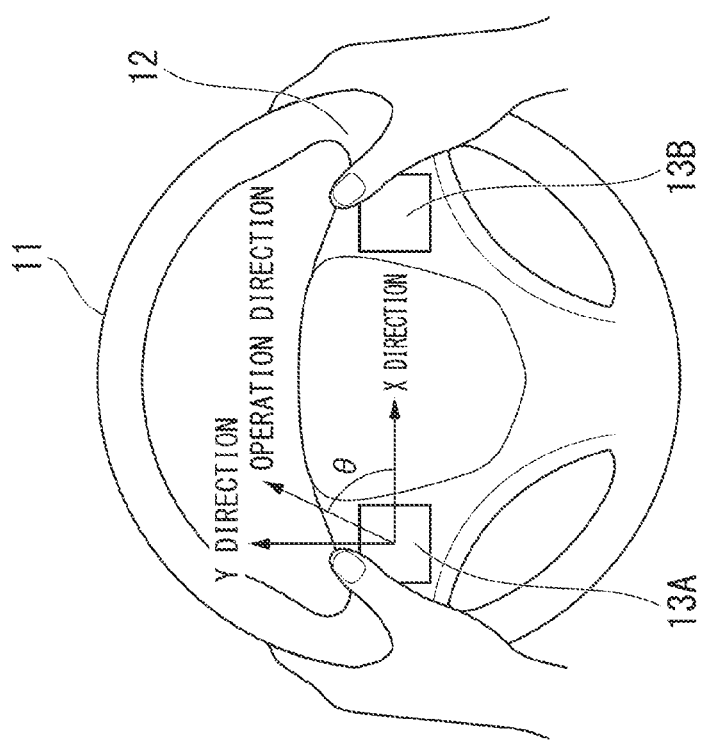
FIG. 3A is a diagram showing an example of an operation coordinate system and an operation input direction with respect to an operation surface of the input apparatus according to the present embodiment.
Figure 3B:
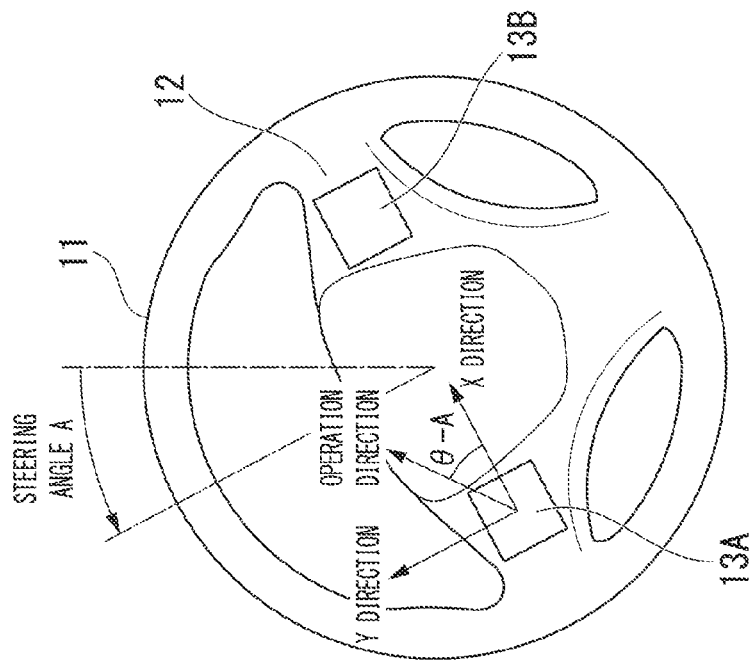
FIG. 3B is a diagram showing an example of the operation coordinate system and the operation input direction with respect to the operation surface of the input apparatus according to the present embodiment.

For example, when the operator steers the steering wheel 11, then as shown in FIGS. 3A and 3B, the operation surface 13A rotates around a rotation axis of the steering wheel 11 together therewith. At this time, a case in which the operator moves a finger of a hand that holds the steering wheel 11 (for example, left thumb) in a predetermined operation input direction while the finger is touching the operation surface 13A is taken into consideration. The X direction and the Y direction of the operation coordinate system with regard to the operation surface 13A change by the steering angle A of the steering wheel from a state with the steering wheel being not steered. In FIGS. 3A and 3B, the detection surfaces 15A and 15B are not shown.

Figure 4A:
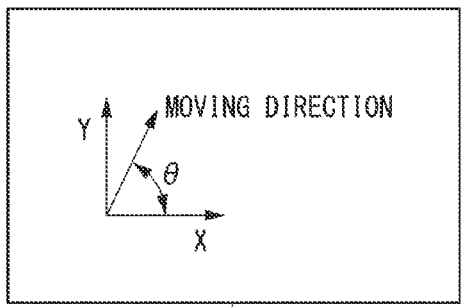
FIG. 4A is a diagram showing an example of a moving direction of an operation object on a display screen of the input apparatus according to the present embodiment.
Figure 4B:
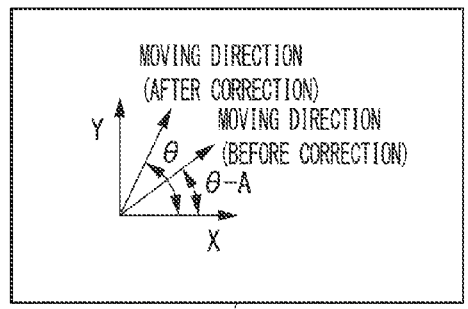
FIG. 4B is a diagram showing an example of the moving direction of the operation object on the display screen of the input apparatus according to the present embodiment.

When the steering wheel 11 is not steered (FIG. 3A), it is predetermined that the operation input direction detected by the operation detecting unit 31 based on the operation coordinate system with regard to the operation surface 13A matches with the moving direction set by the rotation correcting unit 38 based on the display coordinate system with regard to the display screen 14a. In an example shown in FIGS. 4A and 4B, respective directions of the X axis and the Y axis are horizontal and vertical, respectively. At this time, the directions of the X axis and the Y axis forming the operation coordinate system with regard to the operation surface 13A and the directions of the X axis and the Y axis forming the display coordinate system with regard to the display screen 14a match with each other. In the example shown in FIG. 4A, the moving direction is θ.

On the other hand, when the steering wheel 11 is steered (FIG. 3B), the operation input direction detected by the operation detecting unit 31 based on the operation coordinate system with regard to the operation surface 13A deviates from the moving direction set by the rotation correcting unit 38 based on the display coordinate system with regard to the display screen 14a as a reference, by the steering angle A of the steering wheel 11. In the example shown in FIG. 4B, the moving direction before correction is θ-A.

When the rotation correcting unit 38 corrects the directions of the X axis and the Y axis of the operation coordinate system with regard to the operation surface 13A to rotate by the steering angle A of the steering wheel 11, the corrected directions of the X axis and the Y axis match with the directions of the X axis and the Y axis of the operation coordinate system when the steering wheel 11 is not steered. As a result, in the case in which the steering wheel 11 is not steered and the case in which the steering wheel 11 is steered, the moving directions thereof match with each other. In the example shown in FIG. 4B, the moving direction after correction is θ.

Returning to FIG. 2, for example, the running condition determining unit 41 determines the running condition of the vehicle based on the speed signal input from the speed sensor 18. For example, when the speed indicated by the speed signal is equal to a predetermined speed threshold (for example, 0 km per hour), the running condition determining unit 41 determines that the vehicle is being stopped, and when the speed indicated by the speed signal is higher than the predetermined speed threshold, the running condition determining unit 41 determines that the vehicle is running. The running condition determining unit 41 outputs a running condition signal indicating the determined running condition, to the operation input direction recognizing unit 44.

In the present embodiment, the speed threshold may be a low speed sufficiently close to 0 km per hour (for example, 4 km per hour). In that case, for example, in forward driving, when the speed indicated by the speed signal is equal to or lower than the predetermined speed threshold (for example, 0 km per hour), the running condition determining unit 41 determines that the vehicle is being stopped. Moreover, for example, in forward driving, when the speed indicated by the speed signal is higher than the speed threshold, the running condition determining unit 41 determines that the vehicle is running. As a result, when the vehicle is running at a sufficiently low speed and attentiveness required for driving the vehicle is relatively low, it can be assumed that the vehicle is being stopped.

As described later, when it is determined that the vehicle is being stopped, restriction of the operation input direction may be released.

The image analyzing unit 42 analyzes the arrangement of images to be displayed on the image display unit 14. The image analyzing unit 42 determines the arrangement feature of element images included in the images of the respective frames. The image analyzing unit 42 may analyze, for example, at least one of; regularity of arrangement of element images in the horizontal direction (X direction) or the vertical direction (Y direction), the ratio of the margin where there are no element images, and a group configuration. The image analyzing unit 42 outputs arrangement information indicating the analyzed arrangement feature of element images, to the display control unit 43 and the operation input direction recognizing unit 44.

Moreover, when the type of screen components predetermined as the element images included in the images of the respective frames is included, the image analyzing unit 42 may output the arrangement information including information indicating the type of the screen components, to the operation input direction recognizing unit 44. As the predetermined type of the screen components, a screen component having high flexibility in the operation input direction (for example, a pointer) or a screen component requiring an operation input direction having high flexibility at the time of operation (for example, a rotation dial) may be set in the image analyzing unit 42.

At the time of analyzing the regularity of the arrangement of element images, the image analyzing unit 42 may calculate autocorrelation between an original image and an image displaced in the horizontal direction or the vertical direction, for example, for the images of the respective frames. When there is a displacement whose calculated autocorrelation is larger than a predetermined autocorrelation threshold and the number of displacements is smaller than a predetermined number (for example, three), the image analyzing unit 42 determines that there is regularity in the arrangement of element images in the displacement direction. This is because the displacement direction corresponds to a direction in which the element images are arranged. When there is no displacement whose calculated autocorrelation is larger than the predetermined autocorrelation threshold or the number of displacements is equal to or larger than the predetermined number (for example, three), the image analyzing unit 42 determines that there is no regularity in the arrangement of element images in the displacement direction.

Even if having determined that there is regularity, when the predetermined type of screen components is included in the images of the respective frames, the image analyzing unit 42 outputs the arrangement information including the information indicating the type of the screen components, to the operation input direction recognizing unit 44.

At the time of analyzing the ratio of the margin, the image analyzing unit 42 calculates; a gap between the element images adjacent to each other in the horizontal direction or the vertical direction, a minimum value of the gap, a statistics value such as a mean value, and a feature amount such as an area ratio of the margin. When the calculated feature amount is smaller than a predetermined feature amount threshold, the image analyzing unit 42 determines that the ratio of the margin is insufficient, and when the calculated feature amount is equal to or larger than the predetermined threshold of the feature amount, the image analyzing unit 42 determines that the ratio of the margin is sufficient.

At the time of analyzing the group configuration, the image analyzing unit 42 determines that the element images belong to the same group, when the element images adjacent to each other are close to each other, that is to say, when the element images have a smaller gap therebetween than a predetermined gap. As a result, the element images are divided into each group, which is the display area in which the element images are concentrated more than in other areas. That is to say, the image analyzing unit 42 determines to which group the element images included in the images of the respective frames belong. The image analyzing unit 42 may then analyze the regularity in the respective groups or between groups.

The image analyzing unit 42 may omit the process of analyzing the arrangement feature of element images of the image for which the display control unit 43 controls the display.

The display control unit 43 controls the arrangement of element images included in the images of the respective frames and forming a part thereof (for example, screen components) based on the running condition signal input from the running condition determining unit 41. The image to be controlled by the display control unit 43 is an image formed of the element images, which is an image in which the control unit 22 can change the arrangement of element images, or an image that can be generated uniquely (for example, a list display screen or a setting screen of function selection or the like). That is to say, even if the image includes element images, if the image is a completed image in which the arrangement of the element images cannot be changed (for example, image contents or the like), the image is not a control target of the display control unit 43.

For example, when the input running condition signal indicates that the vehicle is moving, the display control unit 43 arranges the predetermined types of element images in a predetermined number with a predetermined gap in a predetermined direction (for example, either of the horizontal direction or the vertical direction) to synchronize the images of the respective frames. The display control unit 43 outputs an image signal indicating the synchronized image to the image display unit 14, and outputs the arrangement information indicating that the element images are arranged in the arrangement direction, to the operation input direction recognizing unit 44. This is because, in this case, the operation input to the arrangement direction is required, and demand of an operation input to other directions (for example, a direction orthogonal to the arrangement direction) may be low.

For example, when the input running condition signal indicates that the vehicle is being stopped, the display control unit 43 arranges the element images in a predetermined arbitrary arrangement (for example, on a two-dimensional grid point or on a circumference) to synchronize the images of the respective frames. The arrangement of element images in this case may be an arrangement with higher direction flexibility than the arrangement during running of the vehicle, or may be the same arrangement. The display control unit 43 outputs the image signal indicating the synchronized image to the image display unit 14, and outputs the arrangement information indicating that there is no regularity in the arrangement of element images to the operation input direction recognizing unit 44.

When the running condition signal indicating that the vehicle is being stopped is input, the display control unit 43 may arrange the element images in the predetermined direction to synchronize an image, until the selecting unit 33 inputs a selection signal indicating that the direction recognized by the operation input direction recognizing unit 44 is not used. Because the form of the image to be displayed on the image display unit 14 is not changed regardless of the operator's intention when the vehicle is stopped, the operability can be improved.

The display control unit 43 may arrange the element images in the predetermined arbitrary arrangement to synchronize the images of the respective frames in the following cases, that is, for example, when the selection signal input from the selecting unit 33 indicates that the direction recognized by the operation input direction recognizing unit 44 is not used, or when the rotation correction determination signal input from the rotation correction determining unit 37 indicates that the operation coordinate is not corrected.

The operation input direction recognizing unit 44 recognizes the operation input direction indicated by the touch operation signal input from the operation detecting unit 31 based on the running condition signal input from the running condition determining unit 41 or the arrangement information input from the image analyzing unit 42 or the display control unit 43.

When the input running condition signal indicates that the vehicle is moving, the operation input direction recognizing unit 44 recognizes that the operation input direction indicated by the input touch operation signal is a direction corresponding to the arrangement of element images indicated by the arrangement information input from the image analyzing unit 42 or the display control unit 43. That is to say, the operation input direction recognizing unit 44 considers that the operation input direction indicated by the input touch operation signal is the direction indicated by the arrangement information and the direction in which the element images are arranged.

When having recognized that the operation input direction is the direction corresponding to the arrangement of element images, the operation input direction recognizing unit 44 adopts the coordinate and a change amount in the direction as is, and also adopts a coordinate (fixed value) at a touch start point as a coordinate in a direction perpendicular to the direction. For example, when the direction corresponding to the arrangement of element images is horizontal, the operation input direction recognizing unit 44 recognizes that the operation input direction indicated by the touch operation signal is horizontal. Here, the operation input direction recognizing unit 44 adopts the coordinate or the change amount in the horizontal direction of the touch position as is, and adopts the vertical coordinate at the touch position as the vertical coordinate at the touch start point and determines the change amount as zero. The operation input direction recognizing unit 44 outputs a recognition operation signal indicating the adopted coordinate and change amount, to the operation input direction control unit 45. The recognition operation signal indicates a change of the touch position in the recognized operation input direction.

On the other hand, when the running condition signal input from the operation detecting unit 31 indicates that the vehicle is being stopped, the operation input direction recognizing unit 44 stops recognizing that the input operation input direction indicated by the touch operation signal is the operation input direction corresponding to the arrangement of element images indicated by the input arrangement information. In this case, the operation input direction recognizing unit 44 also stops outputting the recognition operation signal to the operation input direction control unit 45.

The operation input direction recognizing unit 44 may recognize the operation input direction, for example, as shown in any of (a) to (c) below.

(a) The operation input direction recognizing unit 44 recognizes the direction having regularity in the arrangement of element images included in the images of the respective frames as the direction in which the element images are arranged.

The operation input direction recognizing unit 44 recognizes, for example, the operation input direction is the direction having regularity in the arrangement of element images indicated by the arrangement information input from the image analyzing unit 42. Control examples of the operation input direction will be described later with reference to FIGS. 7A and 7B, FIGS. 8A to 8C, and FIGS. 10A to 10C.

(b) The operation input direction recognizing unit 44 determines whether to recognize the operation input direction as the direction corresponding to the arrangement of element images, based on the ratio of the margin in which the element images included in the images of the respective frames are not displayed.

For example, when the arrangement information input from the image analyzing unit 42 indicates that the ratio of the margin is sufficient, the operation input direction recognizing unit 44 recognizes the operation input direction as the direction corresponding to the arrangement of element images indicated by the arrangement information. The control example of the operation input direction will be described later with reference to FIGS. 10A to 10C.

(c) The operation input direction recognizing unit 44 recognizes the operation input direction as the direction in which a group of element images included in the images of the respective frames is arranged, and when any group is selected according to the operation input, recognizes the operation input direction as the direction in which the element images included in the selected group are arranged. In the display area of each group, the element images are concentrated more than in other areas.

The operation input direction recognizing unit 44 performs the process of recognizing the operation input direction based on the group configuration indicated by the arrangement information input from the image analyzing unit 42 and the arrangement of element images belonging to each group. A control example of the operation input direction will be described later with reference to FIGS. 9A to 9C.

When the recognition operation signal is input from the operation input direction recognizing unit 44, the operation input direction control unit 45 performs a process using the operation input direction indicated by the recognition operation signal, for at least one of the element images. The process for the element image is, for example, a process of moving the display position or an instructed position of a pointer, which is a type of the screen components, or a process related to a drag operation to move the icon, which is a type of the screen components, while selecting the icon. The process using the operation input signal is, for example, a process related to movement in the operation input direction, for example, a process of moving the display position or the instructed position of the pointer in the operation input direction, or a process of moving the icon in the operation input direction while selecting the icon. As a result, the operation input direction is limited to the direction recognized during running of the vehicle. The element image to be processed may be a part of or all of the plurality of arranged element images, that is to say, any one or a plurality of element images.

On the other hand, when the recognition operation signal is not input, the operation input direction control unit 45 performs the process for the element image by using the operation input direction indicated by the touch operation signal input from the operation detecting unit 31. In this case, the operation input direction is not specifically limited.

Moreover, even when the selection signal input from the selecting unit 33 indicates that the operation input direction is not restricted, the operation input direction control unit 45 performs the process for the element image also by using the operation input direction indicated by the touch operation signal input from the operation detecting unit 31. The operation input direction control unit 45 performs the process for the element image by using the operation input direction indicated by the touch operation signal input from the operation detecting unit 31, also in the cases of (d) and (e) described below.

(d) A case when the operation input direction is corrected according to the steering angle, that is to say, the operation input direction control unit 45 corrects the operation coordinate system based on the rotation correction determination signal input from the rotation correction determining unit 37. The control example of the operation input direction will be described later with reference to FIG. 15.

(e) A case when the predetermined type of screen components is included in the images of the respective frames, for example, when the type of the screen components indicated by the arrangement information input from the image analyzing unit 42 corresponds to the predetermined type of the screen components. The predetermined type of screen components is, for example, the screen component having high flexibility in the operation input direction (for example, the pointer) or the screen component requiring the operation input direction having high flexibility at the time of operation (for example, the rotation dial). The control example of the operation input direction will be described later with reference to FIGS. 8A to 8C, and FIG. 11A to FIG. 14B.

(Input Process)

An example of the input process according to the present embodiment will be described next.

Figure 5:
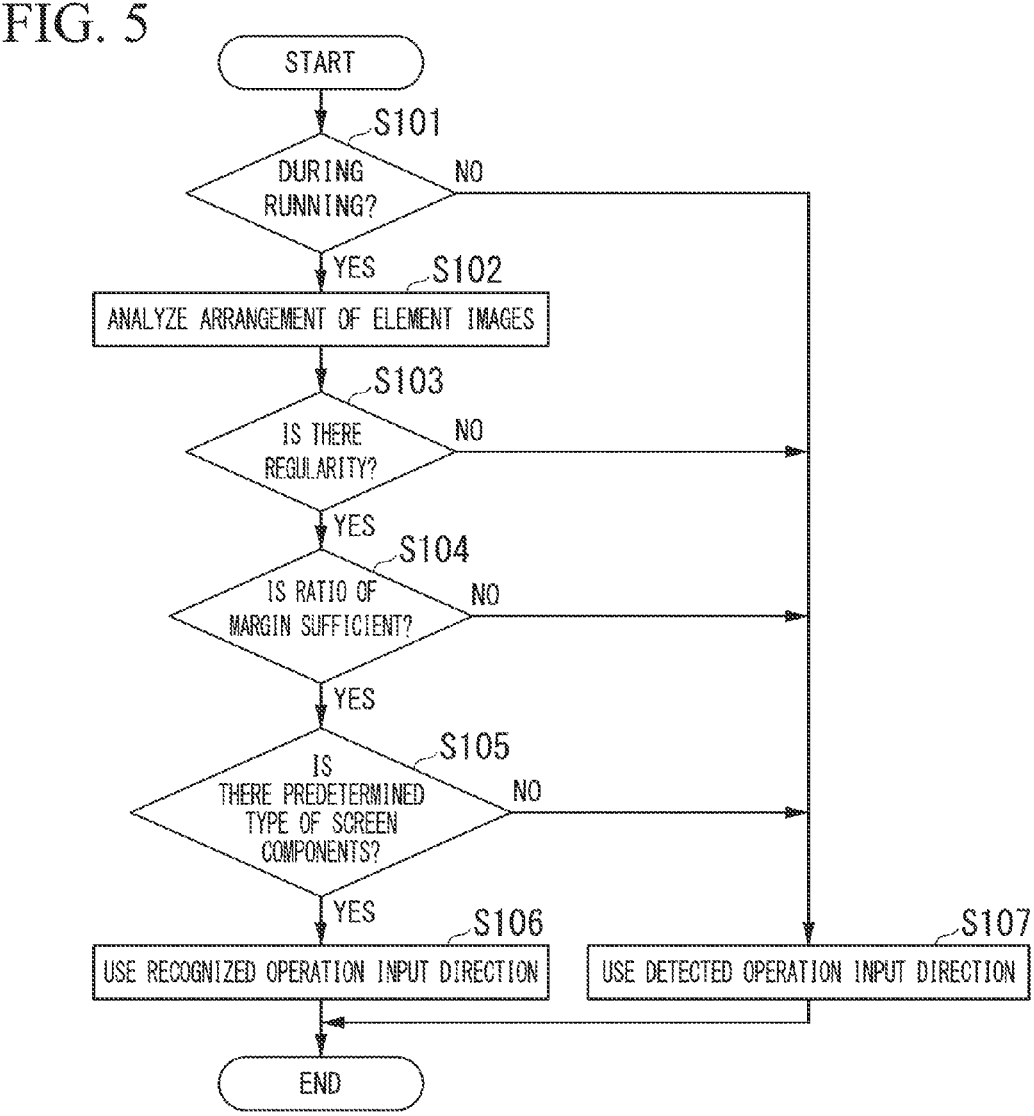
FIG. 5 is a flowchart showing an example of an input process according to the present embodiment.

FIG. 5 is a flowchart showing an example of the input process according to the present embodiment.

(Step S101) The running condition determining unit 41 determines whether the vehicle is moving or being stopped, based on the speed signal input from the speed sensor 18. When the running condition determining unit 41 determines that the vehicle is moving (step S101, YES), control proceeds to step S102. When the running condition determining unit 41 determines that the vehicle is being stopped (step S101, NO), control proceeds to step S107.

(Step S102) The image analyzing unit 42 analyzes the arrangement of element images included in the respective frames of the images to be displayed on the image display unit 14, for example, the presence of regularity, the ratio of the margin, and the presence of the predetermined type of screen components. Thereafter, control proceeds to step S103.

(Step S103) When the image analyzing unit 42 determines that there is regularity (step S103, YES), control proceeds to step S104. When the image analyzing unit 42 determines that there is no regularity (step S103, NO), control proceeds to step S107.

(Step S104) When the image analyzing unit 42 determines that the ratio of the margin where any element image is not arranged is sufficient (step S104, YES), control proceeds to step S105.

When the image analyzing unit 42 determines that the ratio of the margin is insufficient (step S104, NO), control proceeds to step S107.

(Step S105) When the image analyzing unit 42 determines that there is the predetermined type of screen components (step S105, YES), control proceeds to step S106. When the image analyzing unit 42 determines that there is no predetermined type of the screen components (step S105, NO), control proceeds to step S107.

(Step S106) The operation input direction recognizing unit 44 recognizes that the operation input direction, which is the moving direction of the touch position with respect to the operation input unit 13, is for example, a direction determined to have regularity. The operation input direction control unit 45 performs a process for the element image using the operation input direction recognized by the operation input direction recognizing unit 44. Thereafter, the process of the flowchart is finished.

(Step S107) The operation input direction control unit 45 performs the process for the element image using the operation input direction detected by the operation detecting unit 31. Thereafter, the process of the flowchart is finished.

Another example of the input process according to the present embodiment will be described next.

FIG. 6 is a flowchart showing another example of the input process according to the present embodiment.

The input process shown in FIG. 6 includes step S101 in the input process shown in FIG. 5, and includes steps S111 to S114 instead of steps S103 to S105. In the input process shown in FIG. 6, when the running condition determining unit 41 determines that the vehicle is moving in step S101 (step S101, YES), control proceeds to step S111. When the running condition determining unit 41 determines that the vehicle is being stopped (step S101, NO), control proceeds to step S112.

(Step S111) The display control unit 43 arranges the element images in a predetermined direction (for example, the horizontal direction), and synchronizes an image of each frame. Thereafter, control proceeds to step S112.

(Step S112) The operation input direction recognizing unit 44 recognizes the operation input direction detected by the operation detecting unit 31 as the direction determined in step S111. The operation input direction control unit 45 performs the process for the element image using the operation input direction recognized by the operation input direction recognizing unit 44. Thereafter, the process of the flowchart is finished.

(Step S113) The display control unit 43 arranges the element images in an arrangement having higher direction flexibility than the arrangement determined in step S111 (for example, on a two-dimensional grid point) to synchronize an image of each frame. Thereafter, control proceeds to step S114.

(Step S114) The operation input direction control unit 45 performs the process for the element image by using the operation input direction detected by the operation detecting unit 31. Thereafter, the process of the flowchart is finished.

(Control Examples of Operation Input Direction)

Control examples of the operation input direction according to the present embodiment will be described next.

FIGS. 7A and 7B show a control example (1) of the operation input direction.

In FIG. 7A, an image in which four icons 102a to 102d are arranged with an equal gap in the horizontal direction is displayed on the display screen 14a. At this time, the arrangement information indicating that there is regularity in the horizontal direction is input to the operation input direction recognizing unit 44. When the running condition signal indicating that the vehicle is moving is input from the running condition determining unit 41, the operation input direction recognizing unit 44 recognizes that the operation input direction is horizontal indicated by the double-headed arrow, and the operation input direction control unit 45 restricts the operation input direction to the horizontal direction (Simple Mode).

In FIG. 7B, four icons 102a to 102d are displayed on the display screen 14a as in FIG. 7A. At this time, the running condition signal indicating that the vehicle is being stopped is input to the operation input direction recognizing unit 44 from the running condition determining unit 41, and the process of recognizing the operation input direction as being horizontal is stopped. Because the operation input direction control unit 45 uses the operation input direction detected by the operation detecting unit 31, the operation input direction control unit 45 can receive the operation input direction to the vertical direction as well, in addition to the horizontal direction as shown by the double-headed arrow (Normal Mode).

As a result, because the operation input direction is limited to the direction in which the element images are arranged even in the running condition of the vehicle, for example, even when the vehicle is moving, deterioration of the operability is suppressed. Moreover, when the vehicle is being stopped, a change of the operability at the time of releasing the limitation of the operation input direction is suppressed, and hence, the operator will not have a sense of discomfort. As a result, the operability as a whole is improved.

Figure 8A:
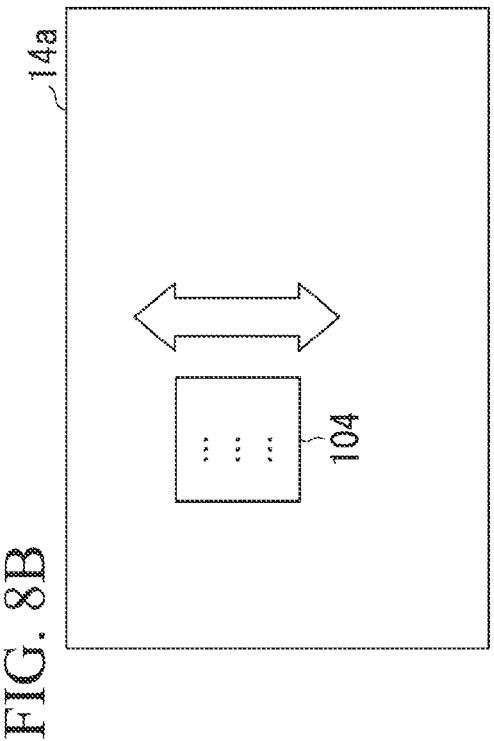
FIG. 8A is a diagram showing a control example (2) of the operation input direction.
Figure 8B:
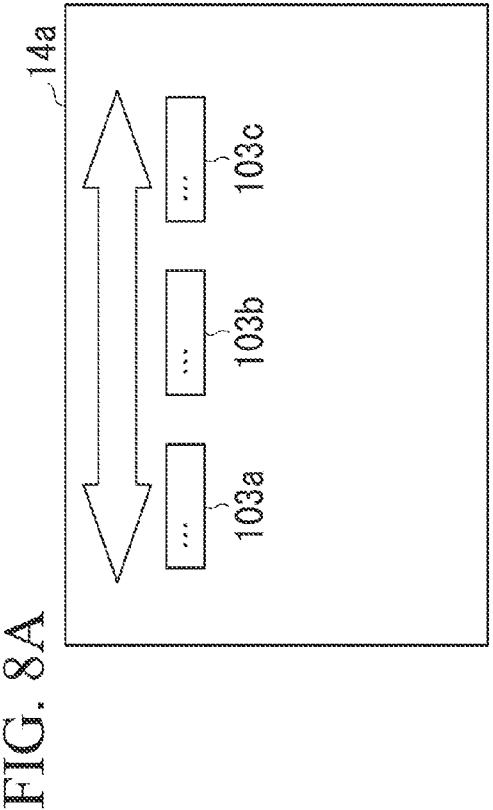
FIG. 8B is a diagram showing the control example (2) of the operation input direction.
Figure 8C:
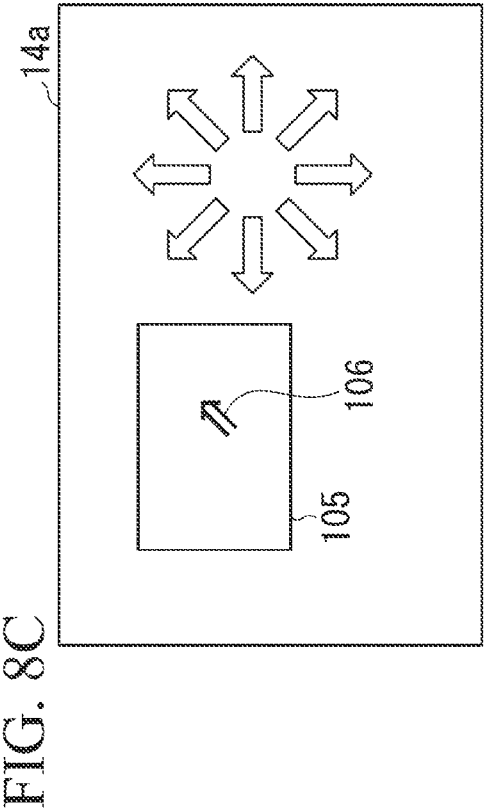
FIG. 8C is a diagram showing the control example (2) of the operation input direction.

FIGS. 8A to 8C show a control example (2) of the operation input direction.

In FIG. 8A, an image in which three lists 103a to 103c are arranged with an equal gap in the horizontal direction is displayed on the display screen 14a. The lists 103a to 103c are respectively one line lists indicating a character string in one line, and the arrangement thereof has regularity in the horizontal direction. That is, a vertical operation is not required for the lists 103a to 103c, and only a horizontal operation is required. In other words, there is flexibility in the horizontal direction. At this time, the arrangement information indicating that there is regularity in the horizontal direction is input to the operation input direction recognizing unit 44.

When the running condition signal indicating that the vehicle is moving is input from the running condition determining unit 41, the operation input direction recognizing unit 44 recognizes that the operation input direction is horizontal indicated by the double-headed arrow, and the operation input direction control unit 45 restricts the operation input direction to the horizontal direction.

In FIG. 8B, an image including one list 104 is displayed on the display screen 14a. The list 104 is a three-line list in which any of character strings arranged vertically in three lines can be selected. The list 104 needs to receive an operation in the vertical direction, and does not have flexibility in the horizontal direction. At this time, the arrangement information indicating the three-line list is input to the operation input direction control unit 45. When the running condition signal indicating that the vehicle is moving is input from the running condition determining unit 41, the operation input direction recognizing unit 44 recognizes that the operation input direction is vertical as shown by the double-headed arrow, and the operation input direction control unit 45 restricts the operation input direction to the vertical direction.

In FIG. 8C, an image including one drawing area 105 and a pointer 106 is displayed on the display screen 14a. The pointer 106 needs to receive any direction in a two-dimensional plane as shown by the arrows or any direction quantized with a 45 degrees gap, in order to select any position in the drawing area 105. That is to say, the pointer 106 requires flexibility in the operation input direction. At this time, the arrangement information indicating the pointer is input to the operation input direction recognizing unit 44. Even when the running condition signal indicating that the vehicle is moving is input from the running condition determining unit 41, the operation input direction recognizing unit 44 stops the process of recognizing that the operation input direction is a specific direction. Because the operation input direction control unit 45 uses the operation input direction detected by the operation detecting unit 31, the operation input direction control unit 45 receives any direction as the operation input direction. Moreover, even if the operation input direction control unit 45 restricts the operation input direction, the operation input direction control unit 45 restricts the operation input direction to any of the quantized directions.

Figure 9A:
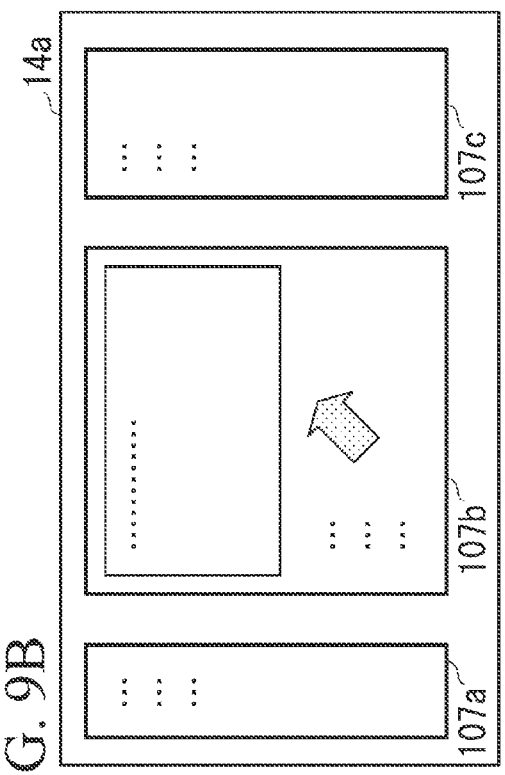
FIG. 9A is a diagram showing a control example (3) of the operation input direction.
Figure 9B:
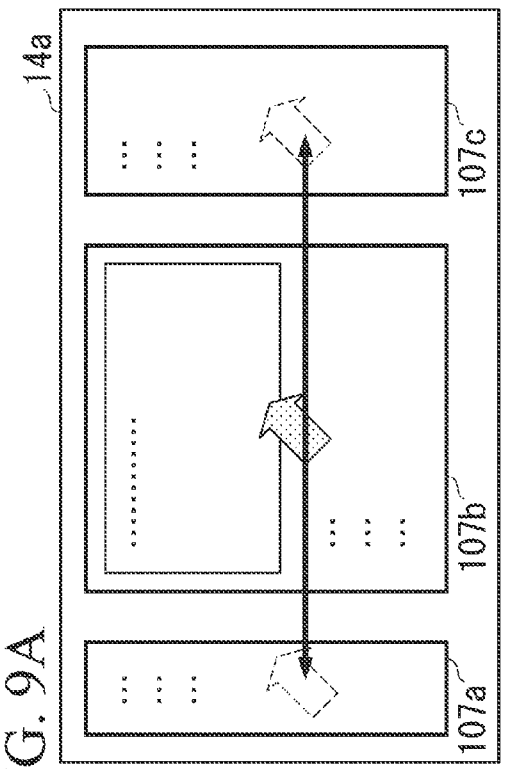
FIG. 9B is a diagram showing the control example (3) of the operation input direction.
Figure 9C:
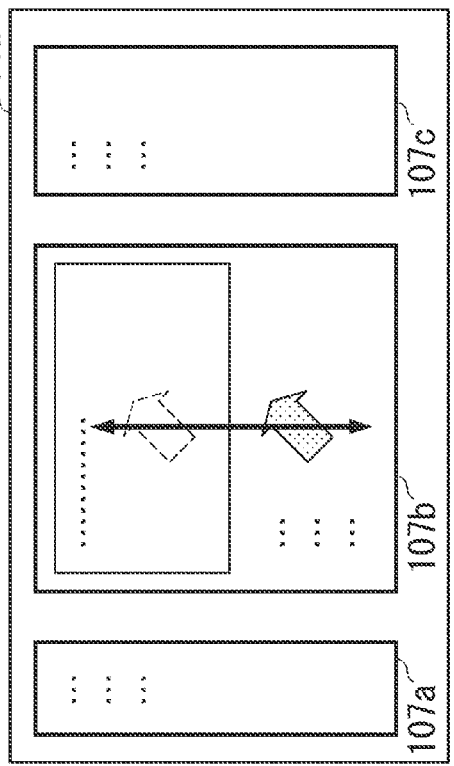
FIG. 9C is a diagram showing the control example (3) of the operation input direction.

FIGS. 9A to 9C show a control example (3) of the operation input direction.

In FIG. 9A, an image indicating a news article is displayed on the display screen 14a. The image includes a plurality of links. The links are classified into three groups 107a to 107c according to the positions thereof. The groups 107a to 107c are arranged horizontally. A plurality of links is arranged vertically in the respective groups 107a to 107c.

At this time, arrangement information indicating that there is regularity in the horizontal direction between the groups, and there is regularity in the vertical direction in the respective groups is input to the operation input direction recognizing unit 44.

When the running condition signal indicating that the vehicle is moving is input from the running condition determining unit 41, the operation input direction recognizing unit 44 recognizes that the operation input direction is horizontal indicated by the double-headed arrow, and the operation input direction control unit 45 restricts the operation input direction to the horizontal direction. The solid arrow diagonally upward to the right included in the group 107b indicates a pointer showing the touch position. The broken arrow diagonally upward to the right included in the groups 107a and 107c respectively indicates that the touch position can be moved to the position.

In the image displayed in FIG. 9B, while the pointer is not displayed in the groups 107a and 107c, the pointer is displayed in the group 107b. The operation input direction control unit 45 determines the group 107b in which the touch position is included continuously for a longer period than a predetermined time (for example, 3 seconds) at the touch position where the pointer is displayed, as a group in which the links included in the area can be selected. When the touch operation signal input from the operation detecting unit 31 at the touch position indicates a predetermined type of operation (for example, double-click), the operation input direction control unit 45 may determine the group 107b as the group in which the links can be selected.

In the image displayed in FIG. 9C, the double-headed arrow is vertically indicated different from FIG. 9A. The arrangement information indicating that the selected group 107b has regularity in the vertical direction is input to the operation input direction recognizing unit 44, the operation input direction recognizing unit 44 recognizes that the operation input direction is vertical, and the operation input direction control unit 45 restricts the operation input direction to the vertical direction. As a result, stepwise selection such as selection of the group by limiting the operation input direction to the arrangement direction of the group, and selection of the element image by limiting the operation input direction to the arrangement direction of the element images in the selected group can be performed. Consequently, even when the element images such as the links, especially the fine element images, are densely arranged, the operator can easily select an intended element image.

FIGS. 10A to 10C show a control example (4) of the operation input direction.

In FIG. 10A, four icons 108a to 108d are arranged regularly both in the horizontal direction and the vertical direction on a grid having two rows and two columns on the display screen 14a. Moreover, there is a sufficient margin (surface ratio is about 0.3) around respective icons. The arrangement information indicating that the margin is sufficient is input to the operation input direction recognizing unit 44 from the image analyzing unit 42. When a running condition signal indicating that the vehicle is moving is input from the running condition determining unit 41, the operation input direction recognizing unit 44 recognizes that the operation input direction is horizontal or vertical, and the operation input direction control unit 45 restricts the operation input direction to the horizontal direction or the vertical direction. Whether to recognize either or both of the horizontal direction and the vertical direction by the operation input direction recognizing unit 44 can be set beforehand.

In FIG. 10B, four icons 109a to 109d are arranged regularly both in the horizontal direction and the vertical direction on a grid having two rows and two columns on the display screen 14a. However, different from the example shown in FIG. 10A, the margin around the respective icons is not sufficient (surface ratio is about 0.03). The arrangement information indicating that the margin is insufficient is input to the operation input direction recognizing unit 44 from the image analyzing unit 42. Even when a running condition signal indicating that the vehicle is moving is input from the running condition determining unit 41, the operation input direction recognizing unit 44 stops the process of recognizing the operation input direction as being a specific direction. Because the operation input direction control unit 45 uses the operation input direction detected by the operation detecting unit 31, the operation input direction is not restricted. This is because even if the touch position moves, since any of the touch positions is included in the area of any icon, any icon can be selected relatively easily without restricting the operation input direction.

In FIG. 10C, four windows 110-1 to 110-4 are arranged on a grid having two rows and two columns on the display screen 14a. The windows 110-1 to 110-4 are areas to display an image based on an image signal generated at the time of executing different application software (hereinafter, referred to as application) by the control unit 22. However, the arrangement and the number of icons included in respective windows 110-1 to 110-4 are different from each other.

Four icons 110-1a to 110-1d are arranged on a grid having two rows and two columns in the window 110-1. Four icons 110-2a to 110-2d are arranged in the window 110-2, and a boundary between the display areas of the icons 110-2a to 110-2d is diagonal lines of the window 110-2. Two icons 110-3a and 110-3b are arranged in one row and two columns in the window 110-3. Two icons 110-4a and 110-4b are arranged in two rows and one column in the window 110-4.

In this case, the arrangement information indicating that there is no regularity both in the horizontal direction and the vertical direction is input to the operation input direction recognizing unit 44 from the image analyzing unit 42. When the running condition signal indicating that the vehicle is moving is input from the running condition determining unit 41, the operation input direction recognizing unit 44 stops the process of recognizing the operation input direction as being a specific direction. Because the operation input direction control unit 45 uses the operation input direction detected by the operation detecting unit 31, the operation input direction is not restricted. Moreover, when the window 110-3 is singly displayed on the display screen 14a, the arrangement information indicating that there is no regularity both in the horizontal direction and the vertical direction is input to the operation input direction recognizing unit 44 from the image analyzing unit 42. Even when the running condition signal indicating that the vehicle is moving is input to the operation input direction recognizing unit 44 from the running condition determining unit 41, the operation input direction recognizing unit 44 stops the process of recognizing the operation input direction as being a specific direction, and the operation input direction control unit 45 uses the operation input direction detected by the operation detecting unit 31. Therefore, the operation input direction is not restricted.

Figure 11A:
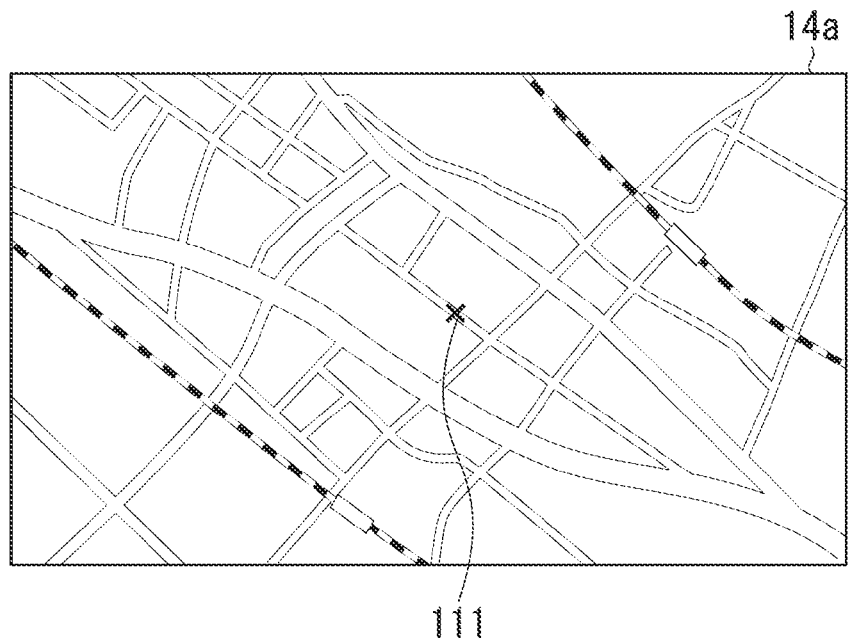
FIG. 11A is a diagram showing a control example (5) of the operation input direction.
Figure 11B:
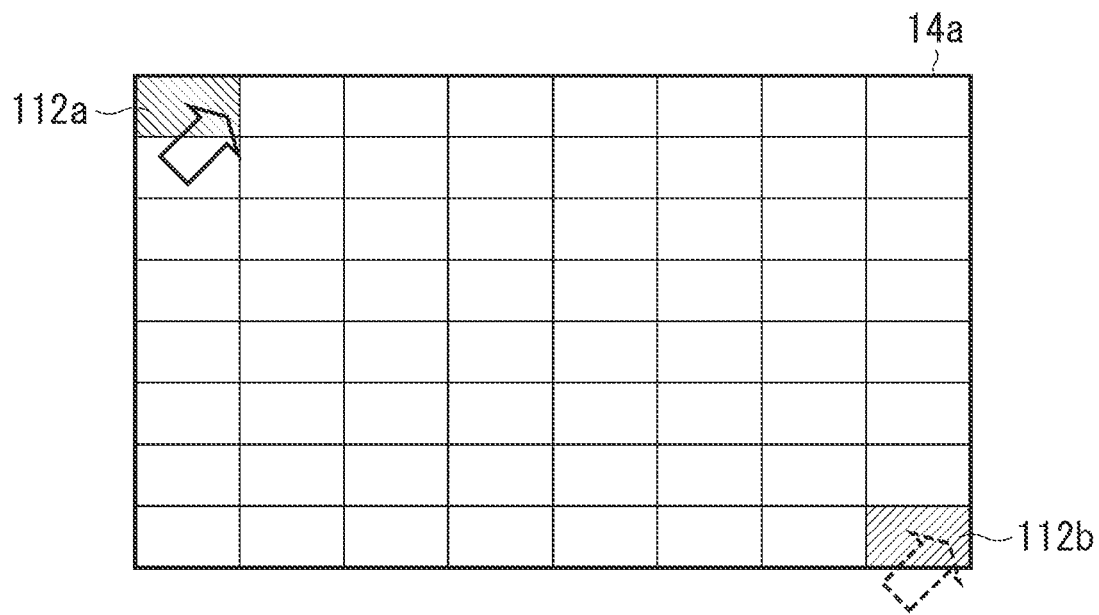
FIG. 11B is a diagram showing the control example (5) of the operation input direction.

FIGS. 11A and 11B show a control example (5) of the operation input direction.

In FIG. 11A, a map is displayed on the display screen 14a, and an X mark pointer 111 is displayed substantially at the center of the map. The pointer 111 indicates the touch position, and is displayed to receive an operation to select an arbitrary position on the map (for example, a reference point of a zooming operation or a destination). In this case, because the operation input direction control unit 45 uses the operation input direction detected by the operation detecting unit 31, the operation input direction is not restricted.

In FIG. 11B, icons are arranged densely on a grid having eight rows and eight columns. It is indicated here that in the display area of an icon 112a at the left upper end indicated by a pointer diagonally upward to the right, a touch position currently indicated by the pointer is included. When the icons are arranged densely, and the operator needs to select an arbitrary icon by displaying the pointer, the operation input direction recognizing unit 44 stops the process of recognizing the operation input direction as being a specific direction, and the operation input direction control unit 45 uses the operation input direction detected by the operation detecting unit 31. Therefore, the operation input direction is not restricted. Because the operation input direction is not restricted, the operator can easily select an intended icon by selecting for example the position of the bottom right icon 112b. On the contrary, when the operation input direction is restricted, for example, to only the horizontal direction or vertical direction, the number of actions involved with the operation increases and the operation becomes complicated.

Figure 12A:
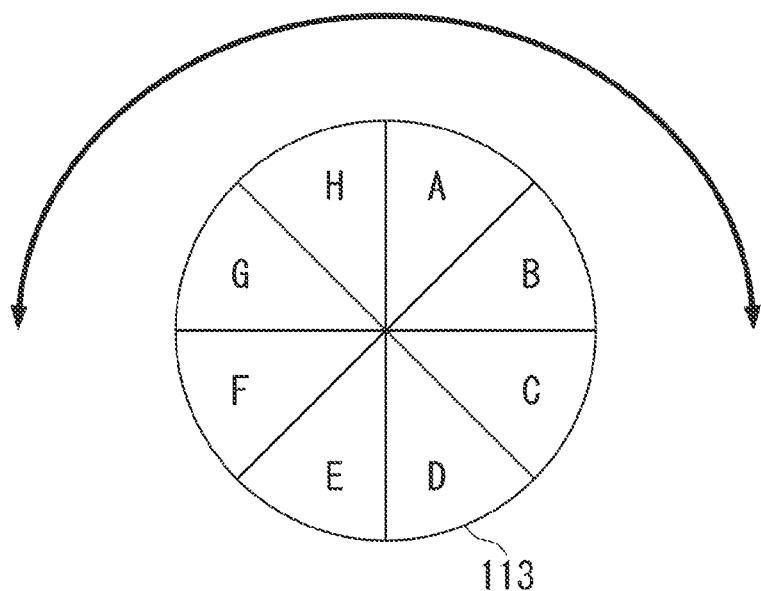
FIG. 12A is a diagram showing a control example (6) of the operation input direction.
Figure 12B:
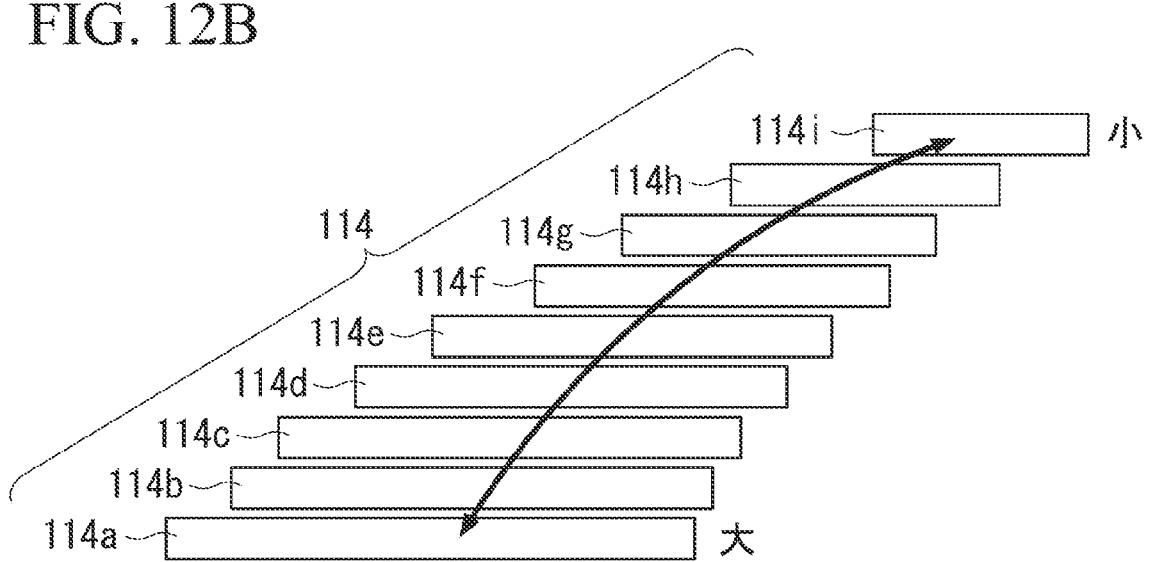
FIG. 12B is a diagram showing the control example (6) of the operation input direction.

FIGS. 12A and 12B show a control example (6) of the operation input direction.

In FIG. 12A, a dial 113 is displayed on the display screen 14a. The dial 113 includes eight sectoral areas A-H. Central angles of the areas A-H are equal to 45°. The double-headed arrow above the dial 113 indicates an operable direction of the dial 113.

In FIG. 12B, a volume selector 114 is displayed on the display screen 14a. The volume selector 114 includes nine elongate blocks 114a to 114i arranged horizontally. The horizontal coordinates are uneven both on the left and right ends of the blocks 114a to 114i. The double-headed arrow toward the upper right across the blocks 114a to 114i indicates that the volume can be selected by selecting any of the blocks 114a to 114i.

However, regarding the dial 113 and the volume selector 114, a user may not be able to estimate the operable direction immediately only by a visual check of the shape. For such an element image, it may be desired that the operator comprehends the operable direction by making it possible to set the operation input direction freely. Consequently, for such a screen component, the operation input direction control unit 45 uses the operation input direction detected by the operation detecting unit 31. Therefore, the operation input direction is not restricted.

Figure 13:
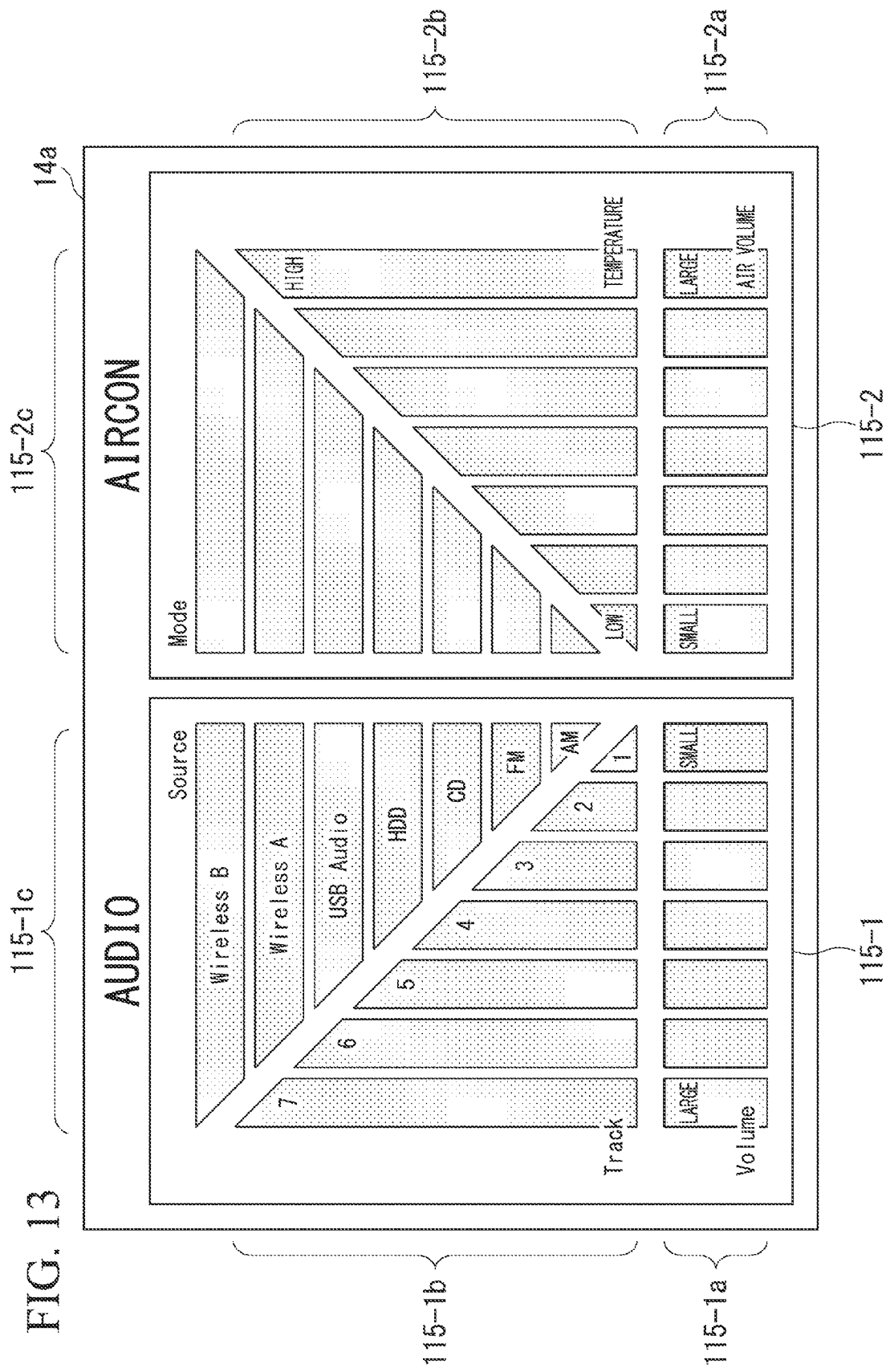
FIG. 13 is a diagram showing a control example (7) of the operation input direction.

FIG. 13 shows a control example (7) of the operation input direction.

In FIG. 13, a setting panel 115 is displayed on the display screen 14a. An audio setting unit 115-1 and an air-conditioner setting unit 115-2 are arranged respectively on the left side and the right side of the setting panel 115. Seven areas of an audio-source selection part (Source) separated in the horizontal direction, which are shown in an upper right half of an upper stage 115-1b of the audio setting unit 115-1, indicate that an audio source corresponding to any of the audio sources, for example, CD (Compact Disk) can be selected. Seven areas of a track selection part (Track) separated in the vertical direction, which are shown in the lower left half of the upper stage 115-1b of the audio setting unit 115-1, indicate that a content corresponding to any of the tracks, for example, music can be selected. Seven areas of a volume setting part (Volume) separated in the vertical direction, which are shown in a lower stage 115-1a of the audio setting unit 115-1, indicate that a larger volume can be selected by moving the touch position from right to left.

Seven areas of a mode selection part (Mode) separated in the horizontal direction, which are shown in the upper left half of an upper stage 115-2b of the air-conditioner setting unit 115-2, indicate that an operation mode corresponding to any of the modes, for example, an auto temperature adjusting mode can be selected. Seven areas of a temperature setting part (Temperature) separated in the vertical direction, which are shown in the lower right half of the upper stage 115-2b of the air-conditioner setting unit 115-2, indicate that temperature corresponding to any of the temperature areas can be selected. Seven areas of an air volume setting part (Air Volume) separated in the vertical direction, which are shown in a lower stage 115-2a of the air-conditioner setting unit 115-2, indicate that a stronger air volume can be set by moving the touch position from left to right.

With regard to the screen components having a different operation input direction for each operation target such as the setting panel 115, the operation input direction control unit 45 uses the operation input direction detected by the operation detecting unit 31. Therefore, the operation input direction is not restricted. As a result, an advantage of the setting panel 115 in that a searching operation of an intended operation target can be omitted without changing over a plurality of operation targets on one screen, can be achieved.

Figure 14A:
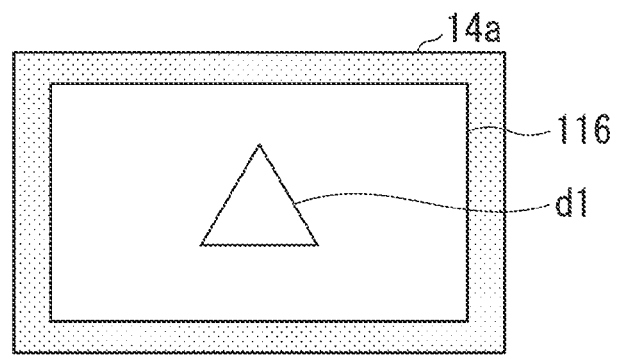
FIG. 14A is a diagram showing a control example (8) of the operation input direction.
Figure 14B:
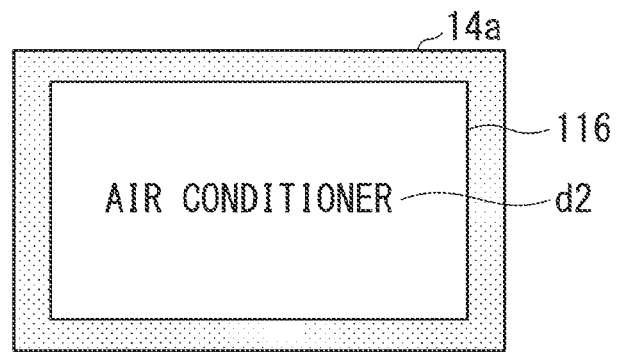
FIG. 14B is a diagram showing the control example (8) of the operation input direction.

FIGS. 14A and 14B show a control example (8) of the operation input direction.

In FIGS. 14A and 14B, a drawing input frame (handwriting input component) 116 is displayed on the display screen 14a. The drawing input frame 116 is a screen component that enables to detect a touch position corresponding to a position included in the display area and to input (drawing input) an image formed by a trajectory of a position corresponding to the detected touch position. When the drawing input frame 116 is displayed, the operation input direction control unit 45 uses the operation input direction detected by the operation detecting unit 31. Therefore, the operation input direction is not restricted.

Here the operation detecting unit 31 may perform coordinate transform from a trajectory of the touch position detected based on the contact signal input from the operation input unit 13 to a trajectory in the display coordinate system based on the correspondence relation between the pre-stored operation coordinate system and the display coordinate system. The operation detecting unit 31 determines which of a predetermined character or sign (hereinafter, referred to as character or the like) is the image indicating the coordinate-transformed trajectory, by performing known image recognition processing. The control unit 22 stores the correspondence relation between the respective characters or the like and a predetermined process and executes the process corresponding to the determined character or the like.

In FIG. 14A, a Δ mark displayed on the drawing input frame 116 is an example of an input image. In this case, the operation input direction control unit 45 performs a process corresponding to the Δ mark, for example, causes the image display unit 14 to display a map used for setting a destination and receives a selection operation of an arbitrary position on the map.

In FIG. 14B, a character "air conditioner" displayed on the drawing input frame 116 is another example of the input image. In this case, the operation input direction control unit 45 performs a process corresponding to the character "air conditioner", for example, causes the image display unit 14 to display an air-conditioner setting image in order to set an operation of the air conditioner.

In this manner, because the operation input direction is not restricted, drawing input that requires a free operation input direction is not obstructed.

Figure 15:
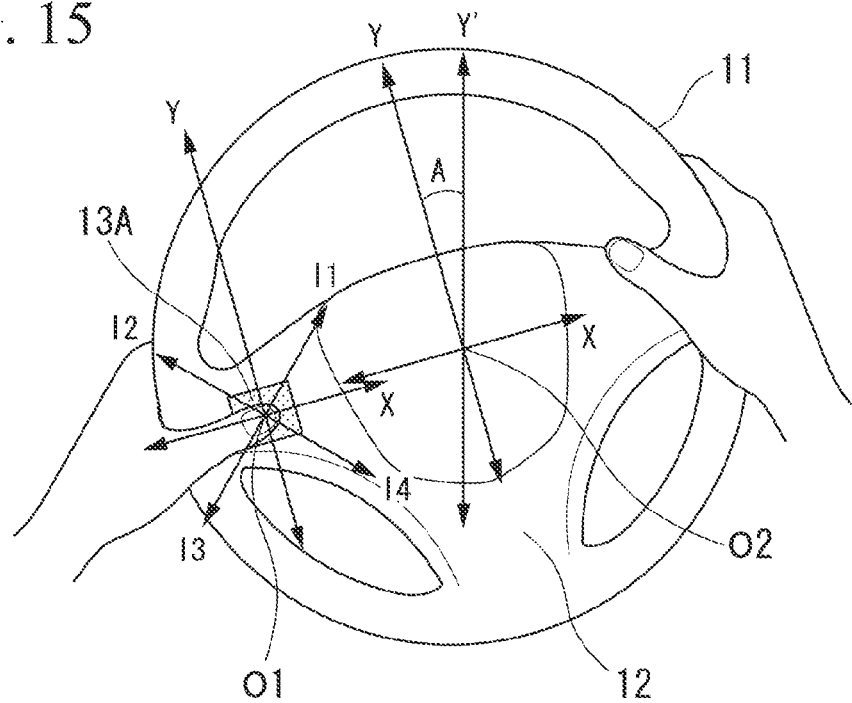
FIG. 15 is a diagram showing a control example (9) of the operation input direction.

FIG. 15 shows a control example (9) of the operation input direction. Here, the operation surface 13B is not shown.

FIG. 15 shows a situation where the operator touches a thumb to a touch position O1 on the operation surface 13A, when steering the steering wheel 11. In the example shown in FIG. 15, the steering wheel 11 is rotated by a steering angle A.

Here, eight arrows starting from the touch position O1 indicate that the operation input direction is limited to any of the directions shown by these arrows. An angle formed between two adjacent arrows of the eight arrows is 45° in this example. Two arrows diagonally upward to the right and diagonally downward to the left of the eight arrows form an X axis, and two arrows diagonally upward to the left and diagonally downward to the right of the eight arrows form a Y axis. In this case, because the operation input direction is discretized with an interval of 45°, even if the rotation correcting unit 38 corrects the operation input direction θ by the steering angle A, sufficient accuracy cannot be obtained. Therefore, when the operation input direction θ is to be corrected by the steering angle A, that is, the rotation correction determining unit 37 determines to correct the operation coordinate system, the operation input direction control unit 45 uses the operation input direction detected by the operation detecting unit 31. Therefore, the operation input direction is not restricted. As a result, high accuracy due to correction is not lost.

(Modification Example)

A modification example of the present embodiment will be described next.

The rotation correcting unit 38 corrects the touch position indicated by the touch operation signal input from the operation detecting unit 31 based on the holding state signal input from the holding state detecting unit 32, in addition to the rotation correction determination signal input from the rotation correction determining unit 37. For example, by rotating the operation coordinate system clockwise by a total amount of A+B of the steering angle A indicated by the rotation correction determination signal and a correction angle B corresponding to the holding state indicated by the holding state signal, the rotation correcting unit 38 corrects the operation input direction θ to θ−(A+B).

Here, the holding state signal and the predetermined correction angle B are set in association with each other in a storage unit provided in the rotation correcting unit 38, to obtain the correction angle B corresponding to the input holding state signal. The holding state signal indicating that, for example, the left palm is away from the steering wheel is associated with a negative real value (for example, −15°) as the correction angle B in the rotation correcting unit 38. Moreover, the holding state signal indicating that the right palm is away from the steering wheel is associated with a positive real value (for example, 15°) as the correction angle B, and the holding state signal indicating that the palm is not away from the steering wheel is associated with 0° as the correction angle B in the rotation correcting unit 38.

Accordingly, the operation input direction θ is corrected in a further counterclockwise direction with respect to a holding state signal indicating that the left palm is away from the steering wheel, and the operation input direction θ is corrected in a further clockwise direction with respect to a holding state signal indicating that the right palm is away from the steering wheel. As a result, an influence of a movable range of the thumb due to the holding state or of the motion of the thumb can be removed.

An example of the holding state of the steering wheel 11 will be described next.

Figure 16A:
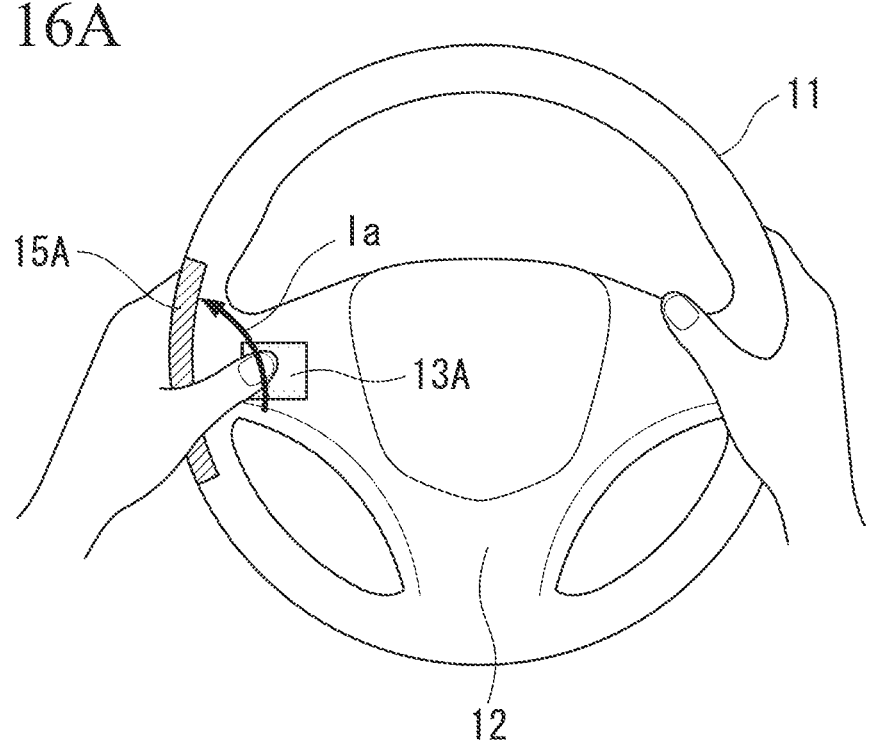
FIG. 16A is a conceptual diagram showing an example of a holding state of a steering wheel 11 according to a modification example.
Figure 16B:
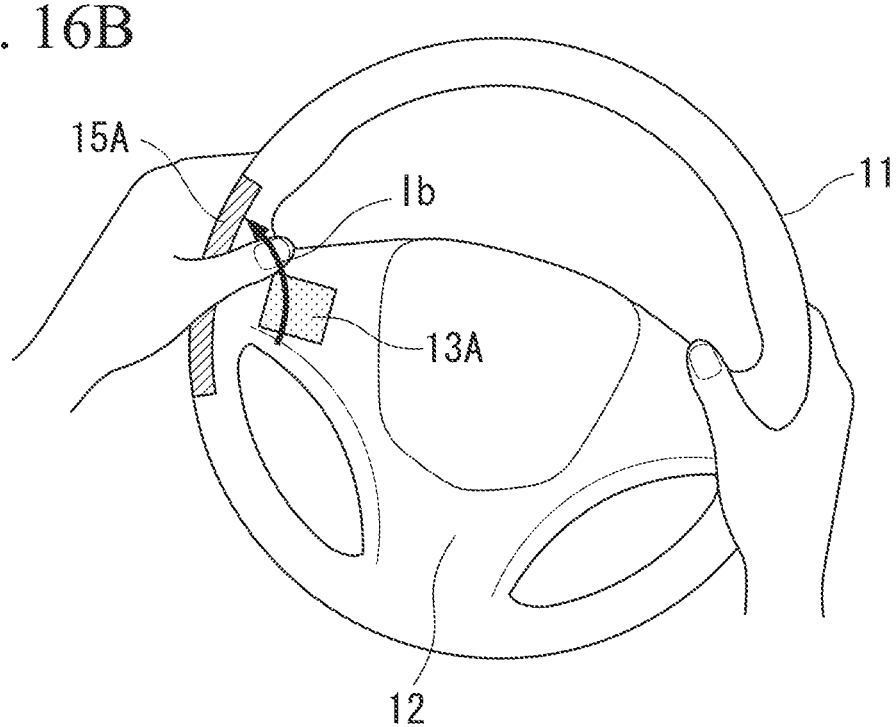
FIG. 16B is a conceptual diagram showing an example of the holding state of the steering wheel 11 according to the present modification example.

FIGS. 16A and 16B are conceptual diagrams showing an example of the holding state of the steering wheel 11 according to the present modification example. Here, the operation surface 13B is not shown.

FIG. 16A shows a situation where the operator moves the touch position while touching the operation surface 13A by a thumb, when the steering wheel 11 is not steered. The upward to the left line segment starting from the bottom end of the operation surface 13A indicates a trajectory 1a of the touch position. Because the tip of the index finger, the palm, and the ball of the thumb of the operator's left hand touch an outer circumference of the steering wheel 11, the holding state detecting unit 32 determines that the palm is not away from the steering wheel.

FIG. 16B shows a situation where the operator moves the touch position while touching the operation surface 13A by a thumb, when the steering wheel 11 is steered clockwise. The upward to the left line segment starting from the bottom end of the operation surface 13A indicates a trajectory 1b of the touch position. At this time, the tip of the left index finger of the operator touches the outer circumference of the steering wheel 11, while the palm and the ball of the thumb are away from the steering wheel 11. Therefore, the holding state detecting unit 32 determines that the left palm is away from the steering wheel 11. At this time, the rotation correcting unit 38 corrects the operation input direction θ counterclockwise by the correction angle B, as compared to the case shown in FIG. 16A. When the left palm is away from the steering wheel 11, the direction of the thumb slants clockwise more than in a case where the direction of the thumb is not steered. Therefore the operation input direction detected by the operation detecting unit 31 also tends to slant clockwise more than an intended direction of the operator. In the modification example, by correcting the detected operation input direction counterclockwise, the operation input direction following the operator's intention can be obtained. As a result, the operability for the user can be improved.

On the other hand, when the steering wheel 11 is steered counterclockwise, the holding state detecting unit 32 determines that the left palm is away from the steering wheel. The rotation correcting unit 38 corrects the operation input direction θ to the operation surface 13B (not shown) clockwise by the correction angle B, as compared to the case shown in FIG. 16A. Also in this case, the operability for the user can be improved.

In the present embodiment, as described above, the operation input direction to the operation input unit 13 attached to the steering wheel 11 is detected, and when the vehicle is moving, it is recognized that the detected operation input direction is the direction corresponding to the arrangement of element images constituting a part of the image to be displayed on the image display unit 14. Moreover, in the present embodiment, the recognized direction is used as the operation input direction related to at least either one of the element images.

Because the direction corresponding to the arrangement of element images is used as the operation input direction related to the element images, an operation input that transits between the areas related to the element images is not disturbed. As a result, the operability at the time of performing the operation input during driving is improved.

A case in which the input apparatus 10 is installed in the vehicle has been explained as an example. However, the present invention is not limited thereto. The input apparatus 10 or a part thereof, for example, the control unit 22 may be implemented, for example, produced, used, transferred, leased, exported, imported, or offered to transfer and lease, in a state of not being installed in the vehicle.

A part of the input apparatus 10 according to the above-described embodiment, for example, the operation detecting unit 31, the holding state detecting unit 32, the selecting unit 33, the rotation correction determining unit 37, the rotation correcting unit 38, the running condition determining unit 41, the image analyzing unit 42, the display control unit 43, the operation input direction recognizing unit 44, and the operation input direction control unit 45 may be realized by a computer. In this case, a program for realizing the control function may be recorded on a computer-readable recording medium, and the program recorded on the recording medium may be read and executed by a computer system. The "computer system" referred to herein is a computer system incorporated in the input apparatus 10, and includes hardware such as an OS and peripheral devices. The "computer-readable recording medium" is a portable medium such as a flexible disk, a magnetooptical disk, a ROM, or a CD-ROM, or a memory device such as a hard disk incorporated in the computer system. Furthermore, the "computer-readable recording medium" may include one that dynamically holds a program for a short time, such as a communication wire when the program is transmitted via a network such as the Internet or a communication line such as a telephone line, and one that holds the program for a certain time such as a volatile memory inside the computer system, which becomes a server or a client in that case. Moreover, the program described above may be a program that realizes a part of the functions described above, and can realize the functions in combination with a program already recorded in the computer system.

Furthermore, a part of or the entire input apparatus 10 in the embodiment described above may be realized as an integrated circuit such as an LSI (Large Scale Integration). Respective functional blocks of the input apparatus 10 may be individually formed as a processor, or a part of or the entire input apparatus may be integrated and formed as a processor. Moreover, a method of forming the integrated circuit is not limited to the LSI, and may be realized by a dedicated circuit or a general-purpose processor. Furthermore, when a technique of forming the integrated circuit is developed as a substitute of the LSI through advancements in the semiconductor technology, the integrated circuit based on the technique may be used.

One embodiment of the present invention has been described in detail with reference to the drawings. However, the specific configuration is not limited thereto, and various design changes can be made without departing from the scope of the present invention.

What is claimed is:

1. An input apparatus comprising:
an operation detecting unit that detects an operation input direction to an operation input unit attached to a steering wheel;
an operation input direction recognizing unit that recognizes the operation input direction detected by the operation detecting unit;
an image display unit that displays element images constituting a part of an image; and
an operation input direction control unit that uses the direction recognized by the operation input direction recognizing unit as the operation input direction related to at least any one of the element images,
wherein the operation input direction recognizing unit determines that a change amount of a touch position in an operation object in a direction perpendicular to a direction of an arrangement of the element images is zero and recognizes that the operation input direction is a direction corresponding to the arrangement of the element images only during a time when a vehicle is in motion; and
wherein the operation input direction recognizing unit recognizes that the operation input direction detected by the operation detecting unit is a direction in which groups of element images to be displayed on the image display unit are arranged, and when any of the groups of the element images is selected, the operation input direction recognizing unit recognizes that the operation input direction detected by the operation detecting unit is a direction in which element images are arranged in any of the groups.

2. The input apparatus according to claim 1, wherein the operation input direction recognizing unit recognizes that the operation input direction detected by the operation detecting unit is a direction having regularity of arrangement of the element images.

3. The input apparatus according to claim 1, wherein the operation input direction recognizing unit determines that the change amount of the touch position in the operation object in the direction perpendicular to the direction of the arrangement of the element images is zero and recognizes that the operation input direction is the direction corresponding to the arrangement of the element images, when the vehicle is running and a ratio of a margin where the element images are not displayed in the image display unit to an area of the element images is higher than a predetermined ratio.

4. The input apparatus according to claim 1, wherein the operation input direction recognizing unit determines whether to recognize the operation input direction as a direction corresponding to an arrangement of the element images, according to flexibility in the operation input direction the element images can be operated.

5. The input apparatus according to claim 1, wherein there is further provided a display control unit that controls the direction to arrange the element images to a predetermined direction when the vehicle is running.

6. The input apparatus according to claim 1, wherein there is further provided a steering angle detecting unit that detects a steering angle of the steering wheel, and the operation input direction control unit determines whether to correct the operation input direction based on the steering angle detected by the steering angle detecting unit, and when the operation input direction is to be corrected, the operation input direction control unit uses the operation input direction detected by the operation detecting unit as the operation input direction related to at least any one of the element images.

7. An input method comprising:
 an operation detecting step of detecting an operation input direction to an operation input unit attached to a steering wheel;
 an operation input direction recognizing step of recognizing the operation input direction detected in the operation detecting step;
 displaying element images constituting a part of an image;
 an operation input direction control step of using the direction recognized in the operation input direction recognizing step as the operation input direction related to at least any one of the element images;
 determining that a change amount of a touch position in an operation object in a direction perpendicular to a direction of an arrangement of the element images is zero and recognizing that the operation input direction is a direction corresponding to the arrangement of the element images only during a time when a vehicle is in motion; and
 recognizing that the operation input direction is a direction in which groups of element images to be displayed on an image display unit are arranged, and when any of the groups of the element images is selected, recognizing that the operation input direction is a direction in which element images are arranged in any of the groups.

8. A processor having a computer program, which when executed,
 causes a computer of an input apparatus to execute:
 an operation detecting procedure of detecting an operation input direction to an operation input unit attached to a steering wheel;
 an operation input direction recognizing procedure of recognizing the operation input direction detected in the operation detecting procedure;
 displaying element images constituting a part of an image;
 an operation input direction control procedure of using the direction recognized in the operation input direction recognizing procedure as the operation input direction related to at least any one of the element images,
 determining that a change amount of a touch position in an operation object in a direction perpendicular to a direction of an arrangement of the element images is zero and recognizing that the operation input direction is a direction corresponding to the arrangement of the element images only during a time when a vehicle is in motion; and
 recognizing that the operation input direction is a direction in which groups of element images to be displayed on an image display unit are arranged, and when any of the groups of the element images is selected, recognizing that the operation input direction is a direction in which element images are arranged in any of the groups.

* * * * *